US011578162B2

(12) United States Patent
Seth et al.

(10) Patent No.: US 11,578,162 B2
(45) Date of Patent: Feb. 14, 2023

(54) CURABLE COMPOSITIONS FOR PRESSURE-SENSITIVE ADHESIVES

(71) Applicant: 3M INNOVATIVE PROPERTIES COMPANY, St. Paul, MN (US)

(72) Inventors: Jayshree Seth, Woodbury, MN (US); Mark F. Ellis, St. Paul, MN (US); Eric W. Nelson, Stillwater, MN (US); Janet A. Venne, Roseville, MN (US); Christopher C. Pope, New Richmond, WI (US); Matthew H. Wessel, Cambridge, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 47 days.

(21) Appl. No.: 17/250,643

(22) PCT Filed: Aug. 8, 2019

(86) PCT No.: PCT/IB2019/056767
§ 371 (c)(1),
(2) Date: Feb. 16, 2021

(87) PCT Pub. No.: WO2020/039294
PCT Pub. Date: Feb. 27, 2020

(65) Prior Publication Data
US 2021/0189042 A1 Jun. 24, 2021

Related U.S. Application Data

(60) Provisional application No. 62/721,248, filed on Aug. 22, 2018.

(51) Int. Cl.
| | |
|---|---|
| *C08F 2/46* | (2006.01) |
| *C08F 2/50* | (2006.01) |
| *C08G 61/04* | (2006.01) |
| *C08F 265/06* | (2006.01) |
| *C09J 7/38* | (2018.01) |
| *C08F 220/18* | (2006.01) |
| *C08F 220/20* | (2006.01) |
| *C08F 220/36* | (2006.01) |
| *C08K 5/105* | (2006.01) |
| *C08K 5/5397* | (2006.01) |

(52) U.S. Cl.
CPC ............. *C08F 265/06* (2013.01); *C08F 2/50* (2013.01); *C08F 220/1808* (2020.02); *C08F 220/1811* (2020.02); *C08F 220/20* (2013.01); *C08F 220/36* (2013.01); *C08K 5/105* (2013.01); *C08K 5/5397* (2013.01); *C09J 7/385* (2018.01); *C08F 2800/20* (2013.01); *C09J 2301/12* (2020.08); *C09J 2433/00* (2013.01)

(58) Field of Classification Search
CPC ....... C09J 7/385; C09J 7/10; C09J 4/06; C09J 133/066; C09J 2301/408; C09J 2301/416; C09J 2301/12; C08F 220/36; C08F 220/18; C08F 220/1811; C08F 220/1808; C08F 220/20; C08F 2/48; C08F 265/06; C08F 290/126; C08F 2800/20; C08K 5/5397; C08K 5/105; C08K 3/36; C08K 5/0025; C08G 18/6229; C08G 18/8116; C08G 2170/40; C09D 151/003
USPC ........... 522/76, 74, 71, 6, 189, 184, 1; 520/1
See application file for complete search history.

(56) References Cited

U.S. PATENT DOCUMENTS

| | | |
|---|---|---|
| 4,181,752 A | 1/1980 | Martens |
| 4,329,384 A | 5/1982 | Vesley |
| 4,330,590 A | 5/1982 | Vesley |
| 4,379,201 A | 4/1983 | Heilmann |
| 4,737,593 A | 4/1988 | Ellrich |
| 5,506,279 A | 4/1996 | Babu |
| 5,637,646 A | 6/1997 | Ellis |
| 5,773,485 A | 6/1998 | Bennett |
| 5,773,836 A | 6/1998 | Hartley |
| 5,986,011 A | 11/1999 | Ellis |
| 6,214,460 B1 | 4/2001 | Bluem |
| 6,883,908 B2 | 4/2005 | Young |
| 7,297,400 B2 | 11/2007 | Yang |
| 7,691,437 B2 | 4/2010 | Ellis |
| 7,767,728 B2 | 8/2010 | Lu |
| 8,361,632 B2 | 1/2013 | Everaerts |
| 8,361,633 B2 | 1/2013 | Everaerts |

(Continued)

FOREIGN PATENT DOCUMENTS

| | | |
|---|---|---|
| WO | WO 2005-044940 | 5/2005 |
| WO | WO 2011-112508 | 9/2011 |

(Continued)

OTHER PUBLICATIONS

Takahashi et al, WO 2012077806 Machine Translation, Jun. 14, 2012 (Year: 2012).*

(Continued)

*Primary Examiner* — Jessica Whiteley
(74) *Attorney, Agent, or Firm* — Jean A. Lown

(57) ABSTRACT

Curable compositions, cured compositions, articles containing the curable or cured compositions, and methods of making the articles are provided. More particularly, the curable compositions contain a (meth)acrylate-based polymer having pendant (meth)acryloyl groups, at least one monomer having a single ethylenically unsaturated group, a photoinitiator that includes an acyl phosphine oxide, and a thixotropic agent. The curable compositions can be printed or dispensed, if desired, and the cured compositions are pressure-sensitive adhesives.

14 Claims, No Drawings

(56) References Cited

U.S. PATENT DOCUMENTS

| | | | |
|---|---|---|---|
| 9,309,443 B2* | 4/2016 | Yurt | ............... B05D 1/02 |
| 2009/0280322 A1 | 11/2009 | Daniels | |
| 2013/0136874 A1 | 5/2013 | Xia | |
| 2013/0258443 A1 | 10/2013 | Jung | |
| 2015/0284601 A1 | 10/2015 | Yurt | |
| 2016/0289515 A1 | 10/2016 | Clapper | |

FOREIGN PATENT DOCUMENTS

| | | | | |
|---|---|---|---|---|
| WO | WO 2011-119363 | 9/2011 | | |
| WO | WO 2012-077806 | 6/2012 | | |
| WO | WO 2012-088126 | 6/2012 | | |
| WO | WO-2012077806 A1 * | 6/2012 | ......... | B29D 11/0073 |
| WO | WO 2014-078115 | 5/2014 | | |
| WO | WO 2014-093014 | 6/2014 | | |
| WO | WO-2015014381 A1 * | 2/2015 | ........... | B29C 64/112 |
| WO | WO 2015-077114 | 5/2015 | | |
| WO | WO 2016-014225 | 1/2016 | | |
| WO | WO 2016-178871 | 11/2016 | | |
| WO | WO 2017-058499 | 4/2017 | | |
| WO | WO 2019-003138 | 1/2019 | | |
| WO | WO 2019-123182 | 6/2019 | | |
| WO | WO 2020-165692 | 8/2020 | | |

OTHER PUBLICATIONS

Cogswell, "Converging Flow of Polymer Melts in Extrusion Dies", Polymer Engineering and Science, Jan. 1972, vol. 12, No. 1, pp. 64-73.

Hiemenz, "Glass Transition and Factors That Affect the Glass Transition Temperature", Polymer Chemistry, 492-495 (2017).

International Search Report for PCT International Application No. PCT/IB2019/056767, dated Dec. 13, 2019, 6 pages.

* cited by examiner

CURABLE COMPOSITIONS FOR PRESSURE-SENSITIVE ADHESIVES

CROSS REFERENCE TO RELATED APPLICATIONS

This application is a national stage filing under 35 U.S.C. 371 of PCT/IB2019/056767, filed Aug. 8, 2019, which claims the benefit of U.S. Provisional Patent Application No. 62/721,248, filed Aug. 22, 2018, the disclosure of which is incorporated by reference in its/their entirety herein.

BACKGROUND

Some polymeric materials have been formed by applying a layer of a curable composition to the surface of a substrate. The curable composition can contain a pre-polymer (e.g., a syrup polymer) plus additional monomers and crosslinking agents. Cured compositions can be prepared by exposing the curable composition to actinic radiation such as ultraviolet and/or visible radiation. Such polymeric materials and processes are described in U.S. Pat. No. 4,181,752 (Martens et al.), U.S. Pat. No. 4,330,590 (Vesley), U.S. Pat. No. 4,329,384 (Vesley et al.), U.S. Pat. No. 4,379,201 (Heilmann et al.), U.S. Pat. No. 5,506,279 (Babu et al.), U.S. Pat. No. 5,773,836 (Bennett et al.), and U.S. Pat. No. 5,773,485 (Bennett et al.). Some curable compositions have contained (meth)acrylate-based polymers with pendant (meth)acryloyl groups such as those described in PCT application publications WO 2014/078115 (Behling et al.), WO 2017/058499 (Behling et al.), and WO 2013/0258443 (Suwa et al.). The resulting articles with a cured composition are often cut (e.g., die cut) or slit to a desired size and shape.

There is an increasing need for adhesive articles with small dimensions. Cutting small articles with a complex shape from a large adhesive article can be challenging. There is an increasing need for adhesive compositions that can be printed or dispensed to the desired size and shape. Various printable or dispensable adhesive compositions have been described in U.S. Pat. No. 6,214,460 (Bluem et al.) and PCT application publications WO 2016/178871 (Campbell et al.), WO 2015/077114 (Clapper et al.), WO 2005/044940 (Ellis et al.), and WO 2014/093014 (Yurt et al.).

SUMMARY

Curable compositions, cured compositions, articles containing the curable or cured compositions, and method of making the curable and cured compositions are provided. The curable compositions contain a (meth)acrylate-based polymer having pendant (meth)acryloyl groups, at least one monomer having a single ethylenically unsaturated group, a photoinitiator, and a thixotropic agent. The curable compositions can be printed or dispensed, if desired, and the cured compositions are pressure-sensitive adhesives.

In a first aspect, a curable composition is provided that contains (a) a (meth)acrylate-based polymer having pendant (meth)acryloyl groups and having a weight average molecular weight in a range of 25,000 to 400,000 Daltons, (b) at least one monomer having a single ethylenically unsaturated group, (c) a photoinitiator comprising an acyl phosphine oxide, and (d) a thixotropic agent comprising inorganic oxide particles. The curable composition is free or substantially free of an epoxy resin.

In a second aspect, a cured composition is provided that is a polymerized reaction product of the curable composition. The cured composition is formed by exposing the curable composition to actinic radiation.

In a third aspect, a first article is provided that includes a substrate and a curable composition adjacent to the substrate. The curable composition is the same as described above in the first aspect. The curable composition can be in a form of a continuous or discontinuous layer.

In a fourth aspect, a second article is provided that includes a substrate and a cured composition adjacent to the substrate. The cured composition is the same as described above in the second aspect. The cured composition can be in a form of a continuous or discontinuous layer.

In a fifth aspect, a method of making a first article is provided. The method includes providing a curable composition that contains (a) a (meth)acrylate-based polymer having pendant (meth)acryloyl groups and having a weight average molecular weight in a range of 25,000 to 400,000 Daltons, (b) at least one monomer having a single ethylenically unsaturated group, (c) a photoinitiator comprising an acyl phosphine oxide, and (d) a thixotropic agent comprising inorganic oxide particles. The curable composition is free or substantially free of an epoxy resin. The method further includes applying the curable composition adjacent to a surface of a substrate, wherein applying comprises positioning the curable composition in the form of a continuous or discontinuous layer.

In a sixth aspect, a method of making a second article is provided. The method includes providing a curable composition that contains (a) a (meth)acrylate-based polymer having pendant (meth)acryloyl groups and having a weight average molecular weight in a range of 25,000 to 400,000 Daltons, (b) at least one monomer having a single ethylenically unsaturated group, (c) a photoinitiator comprising an acyl phosphine oxide, and (d) a thixotropic agent comprising inorganic oxide particles. The curable composition is free or substantially free of an epoxy resin. The method further includes applying the curable composition adjacent to a surface of a substrate, wherein applying comprises positioning the curable composition in the form of a continuous or discontinuous layer. The method still further includes exposing the curable composition to actinic radiation to form a cured composition that contains a polymerized reaction product of the curable composition.

DETAILED DESCRIPTION

Curable compositions, cured compositions formed by exposing the curable compositions to actinic radiation (e.g., radiation in the ultraviolet and/or visible region of the electromagnetic spectrum), articles containing the curable or cured compositions, and methods of making the articles are provided. More particularly, the curable compositions contain a (meth)acrylate-based polymer having pendant (meth)acryloyl groups, at least one monomer having a single ethylenically unsaturated group, a photoinitiator that includes an acyl phosphine oxide, and a thixotropic agent comprising inorganic oxide particles. The cured compositions are formed by exposing the curable compositions to actinic radiation.

The term "actinic radiation" as used herein usually refers to radiation in the ultraviolet and/or visible region of the electromagnetic spectrum. The actinic radiation often has a wavelength of at least 100 nanometers, at least 200 nanometers, at least 240 nanometers, at least 250 nanometers, at least 300 nanometers, at least 350 nanometers, or at least 365 nanometers and up to 500 nanometers, up to 475 nanometers, up to 460 nanometers, or up to 450 nanometers. The wavelength range can be, for example, from 100 to 500 nanometers, 200 to 500 nanometers, 240 to 500 nanometers, 240 to 475 nanometers, 240 to 460 nanometers, 250 to 500 nanometers, or 250 to 475 nanometers.

The curable compositions can be printed or dispensed, if desired. Printing or dispensing the curable composition onto a substrate can be advantageous in some applications because cutting (e.g., die-cutting) to get the desired size and shape is not needed. Die-cutting can add waste to the manufacturing process and can be challenging if the die-cut article has a complex shape and/or small size.

The terms "printed" or "dispensed" refer to different technologies used to apply a composition to a substrate. Dispensing typically implies that the composition being dispensed is forced through some sort of nozzle and/or tube before contacting the substrate. It also does not imply anything about patterning. Something being dispensed may or may not be in the form of a pattern. In some situations, a composition can be dispensed to simply fill a space like a groove, hole, cavity, plate, or slot. Printing often implies that the process of applying the composition to the substrate is done to form a self-standing pattern (i.e., the composition does not spread excessively on the substrate surface such that the pattern is destroyed or not apparent). Printing often includes moving-head printing (jetting or other nozzle-based printing), which are like the moving heads used for dispensing, in which the pattern is imparted by moving the printing head. However, printing also includes various static printing methods like flexographic printing, stencil printing, and screen printing, which are very dissimilar to dispensing. In these methods, the pattern is imparted by an existing pattern on the printing equipment.

The cured compositions are typically pressure-sensitive adhesives. The Pressure-Sensitive Tape Council defines pressure-sensitive adhesives (PSAs) as materials that possess the following properties: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). Materials that are merely sticky or adhere to a surface do not constitute a PSA; the term PSA encompasses materials with additional viscoelastic properties. PSAs are adhesives that satisfy the Dahlquist criteria for tackiness at room temperature and typically exhibit adhesion, cohesion, compliance, and elasticity at room temperature.

The terms "a", "an", and "the" are used interchangeably with "at least one" to mean one or more of the elements being described.

The term "and/or" means either or both. For example, "A and/or B" means only A, only B, or both A and B.

The terms "in a range of" or "in the range of" are used interchangeably to refer to all values within the range plus the endpoints of the range.

The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.

The term "monomer" refers to compounds having at least one ethylenically unsaturated group that can undergo free radical polymerization. In many embodiments, the ethylenically unsaturated group is a (meth)acryloyl group. The monomers can have any desired molecular weight. The term "monomeric unit" refers to a unit within a polymer that is derived from a monomer.

The curable composition contains a (meth)acrylate-based polymer having pendant (meth)acryloyl groups. The term "(meth)acrylate-based polymer" refers to a polymeric material that is formed from multiple different monomers having (meth)acryloyl groups. At least 50 weight percent of the monomeric units in the (meth)acrylate-based polymer are derived from monomers having (meth)acryloyl groups. In some embodiments, at least 60 weight percent, at least 70 weight percent, at least 80 weight percent, at least 90 weight percent, at least 95 weight percent, at least 98 weight percent, at least 99 weight percent, or even 100 weight percent of the monomeric units in the (meth)acrylate-based polymer are derived from monomers having (meth)acryloyl groups.

The term "(meth)acryloyl" refers to a group of formula $CH_2=CHR^1-(CO)-$ where $R^1$ is hydrogen or methyl. The (meth)acryloyl group is a methacryloyl group when $R^1$ is methyl and an acryloyl group when $R^1$ is hydrogen. The (meth)acryloyl group is usually a (meth)acryloyloxy group of formula $CH_2=CHR^1-(CO)-O-$ or (meth)acryloylamido group of formula $CH_2=CHR^1-(CO)-NH-$.

The (meth)acrylate-based polymer having pendant (meth)acryloyl groups is typically formed from another (meth)acrylate-based polymer that is referred to herein as the "precursor (meth)acrylate-based polymer". The precursor (meth)acrylate-based polymer typically has pendant groups such as hydroxyl groups (—OH), carboxylic acid groups (—(CO)—OH), or anhydride groups (—(CO)—O—(CO—)) that can react with an unsaturated reagent compound to produce the (meth)acrylate-based polymer with pendant (meth)acryloyl groups. In many embodiments, the pendant groups in the precursor (meth)acrylate-based polymer are hydroxyl groups.

As used herein, the term "unsaturated reagent compound" refers to a compound having a (meth)acryloyl group plus a complementary group that can react with the pendant hydroxyl groups, pendant carboxylic acid groups, or pendant anhydride groups on the precursor (meth)acrylate-based polymer to prepare the (meth)acrylate-based polymer having pendant (meth)acryloyl groups.

The pendant (meth)acryloyl group is indirectly linked to the backbone of the (meth)acrylate-based polymer through a linking group. The pendant group is typically of formula $CH_2=CHR^1-(CO)-Q-L-$ where L is the linking group, where Q is —O— or —NH—, and where R' is hydrogen or alkyl (e.g., methyl). The group L includes at least one alkylene, arylene, or combination thereof and can optionally further include —O—, —O(CO)—, —NH(CO)—, —NH—, or a combination thereof. Suitable alkylene groups (i.e., an alkylene is a divalent radical of an alkane) often have 1 to 10 carbon atoms, 1 to 6 carbon atoms, or 1 to 4 carbon atoms. Suitable arylene groups (i.e., an arylene is a divalent radical of a carbocyclic aromatic compound) often have 6 to 12 carbon atoms, 6 to 10 carbon atoms, or 6 carbon atoms. The arylene is often phenylene.

The precursor (meth)acrylate-based polymer is typically formed from a polymerizable composition that contains a monomer composition that includes (1) a first monomer that is a (hetero)alkyl (meth)acrylate (i.e., a (hetero)alkyl refers to a heteroalkyl, alkyl, or both) and (2) a second monomer having an ethylenically unsaturated group (e.g., a (meth) acryloyl group) and a functional group (i.e., a hydroxyl group, a carboxylic acid group, or an anhydride group). The (hetero)alkyl (meth)acrylate first monomers are selected to provide the desired modulus and glass transition temperature of the (meth)acrylate-based polymer having pendant (meth) acryloyl groups. The second monomers have a functional group that reacts with the unsaturated reagent compound to provide pendant (meth)acryloyl groups. Typically, not all the functional groups from the second monomer are reacted with the unsaturated reagent compound. The remaining unreacted functional groups from the second monomer can facilitate adhesion of curable and/or cured compositions to a substrate.

Exemplary alkyl (meth)acrylate first monomers often have 1 to 32, 1 to 24, 1 to 20, 1 to 18, 1 to 12, 1 to 10, 1 to 8, or 1 to 4 carbon atoms. Suitable alky (meth)acrylates include, but are not limited to, methyl (meth)acrylate, ethyl (meth)acrylate, n-propyl (meth)acrylate, isopropyl (meth) acrylate, n-butyl (meth)acrylate, isobutyl (meth)acrylate, n-pentyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isononyl (meth)acrylate, isoamyl (meth)acrylate, isobornyl (meth) acrylate, n-decyl (meth)acrylate, isodecyl (meth)acrylate, 2-propylheptyl (meth)acrylate, isotridecyl (meth)acrylate, isostearyl (meth)acrylate, octadecyl (meth)acrylate, 2-octyldecyl (meth)acrylate, dodecyl (meth)acrylate, lauryl (meth) acrylate, and heptadecanyl (meth)acrylates. Some exemplary branched alkyl (meth)acrylates are (meth)acrylic acid esters of Guerbet alcohols having 12 to 32 carbon atoms as described in PCT Patent Application Publication WO 2011/ 119363 (Clapper et al.). Isomers and isomer mixtures of any of the alkyl (meth)acrylates can be used as described, for example, in PCT Patent Application Publication WO 2012/ 088126 (Clapper et al.).

Suitable heteroalkyl (meth)acrylate first monomers include, but are not limited, those having one or more ether linkages, which refers to an oxy group between two alkylene groups. That is, the heteroalkyl contains one or more oxygen heteroatoms. The heteroalkyl groups often have at least 2 carbon atoms, at least 3 carbon atoms, at least 4 carbon atoms, at least 6 carbon atoms, at least 10 carbon atoms and up to 40 or more carbon atoms, up to 30 carbon atoms, up to 20 carbon atoms, or up to 10 carbon atoms. One example is tetrahydrofuran (meth)acrylate. Other examples include alkoxylated alkyl (meth)acrylates such as ethoxyethoxyethyl (meth)acrylate, 2-methoxyethyl (meth)acrylate, and 2-ethoxyethyl (meth)acrylate; and poly(alkylene oxide) (meth)acrylates such as poly(ethylene oxide) (meth)acrylates and poly(propylene oxide) (meth)acrylates. The poly (alkylene oxide) acrylates are often referred to as poly (alkylene glycol) (meth)acrylates. These monomers can have any suitable end group such as a hydroxyl group or an alkoxy group. For example, when the end group is a methoxy group, the monomer can be referred to as methoxy poly(ethylene glycol) (meth)acrylate. If the end group is a hydroxyl group, the monomer is classified as a second monomer having a functional hydroxyl group.

In some embodiments, at least some of the monomers used to form the precursor (meth)acrylate-based polymer are selected to be from renewable resources. For example, at least 25 weight percent, at least 30 weight percent, at least 35 weight percent, at least 40 weight percent, at least 45 weight percent, or at least 50 weight percent of the monomers used to form the precursor (meth)acrylate can be from renewable resources. The amounts are based on the total weight of monomers in the monomer composition used to form the precursor (meth)acrylate-based polymer. One such monomer is 2-octyl acrylate.

In many embodiments, the monomer composition in the polymerizable composition used to form the precursor (meth)acrylate-based polymer contains at least 50 weight percent, at least 55 weight percent, at least 60 weight percent, at least 65 weight percent, at least 70 weight percent, at least 75 weight percent, or at least 80 weight percent (hetero)alkyl (meth)acrylate. The monomer composition can contain up to 99.9 weight percent, up to 99.5 weight percent, up to 99 weight percent, up to 98 weight percent, up to 95 weight percent, up to 90 weight percent, up to 85 weight percent, up to 80 weight percent, up to 75 weight percent, up to 70 weight percent, up to 65 weight percent, or up to 60 weight percent (hetero)alkyl (meth) acrylate. The amounts are based on a total weight of monomers in the monomer composition used to form the precursor (meth)acrylate-based polymer. There can be a single or multiple (hetero)alkyl (meth)acrylates in the monomer composition.

The second monomer included in the monomer composition used to form the precursor (meth)acrylate-based polymer has a (meth)acryloyl group and a functional group that reacts with the unsaturated reagent compound to provide pendant (meth)acryloyl groups. The functional group is typically a hydroxyl (—OH) and/or a carboxylic acid (—(CO)—OH) and/or an anhydride group (—(CO)—O—(CO)—). A combination of second monomers can be used.

Useful second monomers having a carboxylic acid group include (meth)acrylic acid, itaconic acid, fumaric acid, crotonic acid, citraconic acid, maleic acid, oleic acid, and β-carboxyethyl acrylate.

Useful monomers having a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth) acrylate); hydroxyalkyl (meth)acrylamides (e.g., 2-hydroxyethyl (meth)acrylamide and 3-hydroxypropyl (meth)acrylamide); and aryloxy substituted hydroxyalkyl (meth) acrylates (e.g., 2-hydroxy-2-phenoxypropyl (meth)acrylate). Additionally, hydroxyl functional monomers based on glycols derived from ethylene oxide or propylene oxide can also be used. These monomers typically have a hydroxyl equivalent weight of less than 400. The hydroxyl equivalent molecular weight is defined as the molecular weight of the monomeric compound divided by the number of hydroxyl groups in the monomer. Ethoxylated hydroxyethyl (meth) acrylate monomers are commercially available from Sartomer (Exton, Pa., USA) under the trade designation CD570, CD571, and CD572. An example hydroxyl terminated polypropylene glycol acrylate is commercially available under the trade name BISOMER PPA 6 from Cognis, Germany.

Useful second monomers having an anhydride group include maleic anhydride and methacrylic acid anhydride.

The monomer composition used to form the precursor (meth)acrylate-based polymer often contains at least 0.1 weight percent, at least 0.2 weight percent, at least 0.3 weight percent, at least 0.5 weight percent, at least 1 weight percent, at least 2 weight percent, at least 3 weight percent, at least 5 weight percent, at least 10 weight percent, at least 15 weight percent, or at least 20 weight percent and up to 40 weight percent, up to 35 weight percent, up to 30 weight percent, up to 25 weight percent, up to 20 weight percent, up to 15 weight percent, up to 10 weight percent, or up to 5 weight percent of the second monomer. The amount of the second monomer is based on a total weight of monomers in the monomer composition used to form the precursor (meth) acrylate-based polymer. Multiple different second monomers can be included in the monomer composition.

Various optional monomers can be included in the monomer composition used to form the precursor (meth)acrylate-based polymer. Some optional (meth)acrylate monomers have an aromatic group. Examples include benzyl (meth)acrylate, 2-phenoxyethyl acrylate, 2-(phenylthio)ethyl acrylate, 2-phenylphenoxyethyl acrylate, 2-biphenylhexyl (meth)acrylate, and 2-(biphenyl)ethyl acrylate. Other optional monomers have a vinyl group that is not a (meth)acryloyl group. Examples include vinyl ethers, vinyl esters (e.g., vinyl acetate), olefinic monomers (e.g., ethylene, propylene, or butylene), styrene, styrene derivatives (e.g., alpha-methyl styrene), and the like. Still other optional monomers are nitrogen-containing monomers. Some example nitrogen-containing monomers are (meth)acrylamide, N-alkyl (meth)acrylamides, and N,N-dialkyl (meth)acrylamides. Example N-alkyl (meth)acrylamides and N,N-dialkyl (meth)acrylamides include N-methyl (meth)acrylamide, N-ethyl (meth)acrylamide, N,N-dimethyl (meth)acrylamide, and N,N-diethyl (meth)acrylamide, N-isopropyl (meth)acrylamide, and N-octyl (meth)acrylamide. Other nitrogen-containing monomers include various N,N-dialkylaminoalkyl (meth)acrylates and N,N-dialkylaminoalkyl (meth)acrylamides such as, for example, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide. Still other include nitrogen-containing monomers include N-vinyl pyrrolidone, N-morpholino (meth)acrylate, diacetone (meth)acrylamide, and N-vinyl caprolactam.

Any of these optional monomers can be present in desired amount but typically the monomer composition contains 0 to 20 weight percent of the optional monomers. In some embodiments, the monomer composition contains less than 15 weight percent, less than 10 weight percent, or less than 5 weight percent of the optional monomers but can contain at least 1 weight percent, at least 2 weight percent, at least 3 weight percent, or at least 5 weight percent of the optional monomers. The amounts are based on a total weight of monomers in the monomer composition used to form the precursor (meth)acrylate-based polymer. Multiple optional monomers can be included in the monomer composition.

The precursor (meth)acrylate-based polymer typically is not cured. Thus, the monomer composition used to form the precursor (meth)acrylate-based polymer typically is free or substantially free of a crosslinking monomer such as, for example, a crosslinking monomer having a plurality of (meth)acryloyl groups. As used herein, the term "substantially free" regarding the crosslinking monomer means that the monomer composition typically contains less than 0.5 weight percent, less than 0.4 weight percent, less than 0.3 weight percent, less than 0.2 weight percent, less than 0.1 weight percent, less than 0.05 weight percent, less than 0.02 weight percent, or less than 0.01 weight percent crosslinking monomer. The weight percent values are based on the total weight of monomers in the monomer composition used to form the precursor (meth)acrylate-based polymer.

In many embodiments, the monomer composition used to prepare the precursor (meth)acrylate-based polymer contains 50 to 99.9 weight percent (hetero)alkyl (meth)acrylate monomers, 0.1 to 40 weight percent second monomers having an ethylenically unsaturated group and a functional group (i.e., a hydroxyl group, carboxylic acid group, or anhydride group) that reacts with the unsaturated reagent compound to provide pendant (meth)acryloyl groups, and 0 to 20 weight percent optional monomers. Stated differently, the precursor (meth)acrylate polymer usually contains 50 to 99.9 weight percent monomeric units derived from (hetero)alkyl (meth)acrylate monomers, 0.1 to 40 weight percent monomeric units derived from second monomers having a hydroxyl group, carboxylic acid group, or anhydride group, and 0 to 20 weight percent monomeric units derived from optional monomers. In many embodiments, the precursor (meth)acrylate polymer contains 50 to 99.9 weight percent monomeric units derived from (hetero)alkyl (meth)acrylate monomers, 0.1 to 40 weight percent monomeric units derived from second monomers having a hydroxyl group, and 0 to 20 weight percent monomeric units derived from optional monomers.

In some embodiments, the monomer composition used to form the precursor (meth)acrylate-based polymer contains 60 to 99.5 weight percent (hetero)alkyl (meth)acrylate monomers and 0.5 to 40 weight percent second monomers, and 0 to 15 weight percent optional monomers. In some embodiments, the monomer composition contains 60 to 99 weight percent (hetero)alkyl (meth)acrylate monomers. 1 to 40 weight percent second monomers, and 0 to 10 weight percent optional monomers. In still other embodiments, the monomer composition contains 60 to 95 weight percent (hetero)alkyl (meth)acrylate monomers, 5 to 40 weight percent second monomers, and 0 to 10 weight percent optional monomers. In yet other embodiments, the monomer composition contains 70 to 95 weight percent (hetero)alkyl (meth)acrylate monomers, 5 to 30 weight percent second monomers, and 0 to 10 weight percent optional monomers or the monomer composition contains 75 to 95 weight percent (hetero)alkyl (meth)acrylate monomers, 5 to 25 weight percent second monomers, and 0 to 10 weight percent optional monomers. The weight percent values are based on the total weight of monomers in the monomer composition used to form the precursor (meth)acrylate-based polymer.

Chain-transfer agents are often included in the polymerizable composition to control the molecular weight of the precursor (meth)acrylate-based polymer. Suitable chain-transfer agents include, but are not limited to, those selected from the group of carbon tetrabromide, hexabromoethane, bromotrichloromethane, 2-mercaptoethanol, tert-dodecylmercaptan, isooctylthioglycoate, 3-mercapto-1,2-propanediol, cumene, pentaerythritol tetrakis(3-mercapto butyrate) (available under the trade name KARENZ MT PEI from Showa Denko), ethylene glycol bisthioglycolate, and mixtures thereof. Depending on the reactivity of the chain-transfer agent selected, the amount of chain transfer agent is often in a range of 0 to 5 weight percent based on the total weight of monomers in the polymerizable composition. In some embodiments, the amount of the chain transfer agent is at least 0.05 weight percent, at least 0.1 weight percent, at least 0.2 weight percent, at least 0.3 weight percent, or at least 0.5 weight percent and can be up to 4.5 weight percent, up to 4 weight percent, up to 3.5 weight percent, up to 3 weight percent, up to 2.5 weight percent, up to 2 weight percent, up to 1.5 weight percent, or up to 1 weight percent. The weight percent values are based on the total weight of monomers in the monomer composition used to form the precursor (meth)acrylate-based polymer.

Various antioxidants and/or stabilizers such as hydroquinone monoethyl ether (p-methoxyphenol, MeHQ) and that available under the trade designation IRGANOX 1010 (pentaerythritol tetrakis(3-(3,5-di-tert-butyl-4-hydroxyphenyl) propionate)) from BASF Corp, (Florham Park, N.J., USA) can be added to increase the temperature stability of the polymeric material. If used, the antioxidant and/or stabilizer is typically added in a range of 0.01 weight percent to 1.0 weight percent based on a total weight of the total weight of monomers in the monomer composition used to form the precursor (meth)acrylate-based polymer.

A free radical initiator is typically used to form the precursor (meth)acrylate-based polymer. The free radical initiator can be a photoinitator or a thermal initiator. Multiple photoinitiators or multiple thermal initiators can be used. The amount of the free radical initiator can influence the weight average molecular weight with larger amounts typically producing lower molecular weight polymeric materials. The amount of free radical initiator is usually at least 0.001 weight percent, at least 0.005 weight percent, at least 0.01 weight percent, at least 0.05 weight percent, or at least 0.1 weight percent based on the total weight of monomers. The amount can be up to 5 weight percent, up to 4 weight percent, up to 3 weight percent, up to 2 weight percent, up to 1.5 weight percent, up to 1 weight percent, up to 0.5 weight percent, up to 0.3 weight percent, up to 0.2 weight percent, or up to 0.1 weight percent based on the total weight of monomers.

Suitable thermal initiators include various azo compound such as those commercially available under the trade designation VAZO from Chemours Co. (Wilmington, Del., USA) including VAZO 67, which is 2,2'-azobis(2-methylbutane nitrile), VAZO 64, which is 2,2'-azobis(isobutyronitrile), VAZO 52, which is (2,2'-azobis(2,4-dimethylpentanenitrile), and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, Pa., USA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In many embodiments, a photoinitiator is used to form the precursor (meth)acrylate-based polymer. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenyl phosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio) phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA)).

The reaction of the polymerizable composition to form the precursor (meth)acrylate-based polymer can occur in the presence or absence of an organic solvent. If an organic solvent is included in the polymerizable composition, the amount is often selected to provide the desired viscosity. Examples of suitable organic solvents include, but are not limited to, methanol, tetrahydrofuran, ethanol, isopropanol, pentane, hexane, heptane, acetone, methyl ethyl ketone, methyl acetate, ethyl acetate, toluene, xylene, and ethylene glycol alkyl ether. Those organic solvents can be used alone or as mixtures thereof. In many embodiments, the polymerization occurs with little or no organic solvent present. That is the polymerizable composition is free of organic solvent or contains a minimum amount of organic solvent. If used, the organic solvent is often present in amounts less than 10 weight percent, less than 5 weight percent, less than 4 weight percent, less than 3 weight percent, less than 2 weight percent, or less than 1 weight percent based on the total weight of the polymerizable composition.

The precursor (meth)acrylate-based polymer can be formed from the polymerizable composition using any suitable method. The polymerization can occur in a single step or in multiple steps. That is, all or a portion of the monomers and/or free radical initiator may be charged into a suitable reaction vessel and polymerized. For example, a polymerizable composition containing an organic solvent and a thermal initiator can be mixed and heated at an elevated temperature such as in a range of 50° C. to 100° C. for several hours.

In some embodiments, the precursor (meth)acrylate-based polymer is prepared using an adiabatic process as described, for example, in U.S. Pat. No. 5,986,011 (Ellis et al.) and U.S. Pat. No. 5,637,646 (Ellis). In this polymerization method, the polymerizable composition, including at least one thermal initiator, is sealed in a reaction vessel. The contents are mixed and purged of oxygen and, if not already at induction temperature, then warmed to the induction temperature. The induction temperature, which is usually in the range of 40° C. to 75° C., depends on various factors such as the monomers, the initiator, and the amount of the initiator used. The polymerization is performed under essentially adiabatic conditions with a peak reaction temperature in the range of 100° C. to 200° C. Multiple reaction steps with optional cooling in between steps can be employed to increase polymerization conversion on each successive step and to control the molecular weight. Optionally, various reaction components can be added in multiple steps to control the properties (e.g., molecular weight, molecular weight distribution, and polymer composition) of the resulting polymeric material.

Once the precursor (meth)acrylate is prepared, it is reacted with the unsaturated reagent compound to provide the (meth)acrylate-based polymer having pendant (meth) acryloyl groups. The unsaturated reagent compound contains a (meth)acryloyl group and a complementary functional group that reacts with a pendant functional group of the precursor (meth)acrylate-based polymer, which is typically a hydroxyl group, a carboxylic acid group, or an anhydride group. Generally, the reaction is between nucleophilic and electrophilic functional groups that react by a ring opening, addition, or condensation reaction. When the functional group on the precursor (meth)acrylate-based polymer and the complementary functional group of the unsaturated reagent compound react, the resulting (meth)acrylate-based polymer will have pendant (meth)acryloyl groups.

Where the pendant reactive functional group of the precursor(meth)acrylate-based polymer includes a hydroxyl group, the complementary functional group of the unsaturated reagent compound is typically a carboxylic acid, isocyanato, epoxy, or anhydride group. Where the pendant reactive functional group of the precursor (meth)acrylate-based polymer includes a carboxylic acid group, the complementary functional group of the unsaturated reagent compound is typically a hydroxyl, amino, epoxy, isocyanato, aziridino, azetidino, or oxazolinyl group. When the pendant group of the precursor(meth)acrylate-based polymer includes an anhydride, the complementary functional group of the unsaturated reagent compound can be a hydroxyl or amino group. The use of a precursor (meth)acrylate-based polymer having hydroxyl group may be preferable in applications where the cured composition is used in articles having metal-containing components. Hydroxyl groups are less problematic in terms of corrosion than acidic groups or anhydride groups.

In certain embodiments, the pendant (meth)acryloyl groups can be formed from the reaction between hydroxyl groups in the precursor (meth)acrylate-based polymer and isocyanatoethyl (meth)acrylate as the unsaturated reagent compound. In certain embodiments, the pendant (meth)acryloyl groups can be formed from the reaction between carboxylic acids in the precursor (meth)acrylate-based polymer with glycidyl (meth)acrylate as the unsaturated reagent compound. In certain other embodiments, the pendant (meth)acryloyl group can be formed between anhydride groups in the precursor (meth)acrylate-based polymer and a hydroxyl functional monomer, such as 2-hydroxyethyl (meth)acrylate, 3-hydroxypropyl (meth)acrylate, or 2-hydroxyethyl (meth)acrylamide, as the unsaturated reagent compound.

If the second monomer is a hydroxyalkyl (meth)acylate or a hydroxyalkyl (meth)acrylamide and the unsaturated reagent compound is an isocyanatoalkyl (meth)acrylate, the pendant (meth)acryloyl group is of formula —(CO)—O-L$^1$-O—(CO)—NH-L$^2$-Q-(CO)—C(R$^1$)=CH$_2$. The groups L$^1$ and L$^2$ are each independently an alkyl having 1 to 10 carbon atoms, 1 to 6 carbon atoms, 1 to 4 carbon atoms, or 2 to 4 carbon atoms. The group Q is oxy or —NH—. The group R$^1$ is hydrogen or methyl. If the second monomer is 3-hydroxypropyl acrylate and the unsaturated reagent compound is isocyanatoethyl methacrylate, the pendant (meth)acryloyl groups are (CO)—O—CH$_2$CH$_2$CH$_2$—O—(CO)—NH—CH$_2$CH$_2$—O—(CO)—C(CH$_3$)=CH$_2$. This corresponds to the formula above where L$^1$ is propylene, L$^2$ is ethylene, and Q is oxy, and R$^1$ is methyl.

The reaction between the precursor (meth)acrylate-based polymer and the unsaturated reagent compound often occurs at room temperature or at elevated temperatures such as a temperature up to 150° C. or even higher, up to 120° C., up to 100° C., up to 90° C., up to 80° C., up to 60° C., or up to 40° C. Further, this reaction often occurs in the presence of some oxygen since oxygen can inhibit radical propagation. For example, the volume ratio of nitrogen to oxygen is often about 90:10.

All or any fraction of the pendant reactive functional groups of the precursor (meth)acrylate-based polymer can be reacted with the unsaturated reagent compound. Up to 100 mole percent, up to 95 mole percent, up to 90 mole percent, up to 85 mole percent, up to 80 mole percent, up to 75 mole percent, up to 70 mole percent, up to 60 mole percent, up to 50 mole percent, up to 40 mole percent, up to 30 mole percent, or up to 20 mole percent and at least 1 mole percent, at least 2 mole percent, at least 5 mole percent, at least 7 mole percent, at least 10 mole percent, at least 12 mole percent, at least 15 mole percent, or at least 20 mole percent of the pendant reactive functional groups of the precursor (meth)acrylate-based polymer are reacted with the unsaturated reagent compound. The remaining pendant reactive functional groups after reaction with the unsaturated reagent compound often facilitate miscibility of the (meth)acrylate-based polymer having pendant (meth)acryloyl groups with other components of the curable composition. Further, the remaining pendant reactive functional groups can facilitate adhesion of the curable composition and final cured composition to a substrate.

In some embodiments, the (meth)acrylate-based polymer having pendant (meth)acryloyl groups contains at least 0.1 weight percent, at least 0.2 weight percent, at least 0.5 weight percent, at least 1 weight percent, at least 2 weight percent, or at least 5 weight percent and up to 10 weight percent, up to 8 weight percent, up to 6 weight percent, up to 5 weight percent, up to 4 weight percent, up to 2 weight percent, or up to 1 weight percent monomeric units having a pendant (meth)acryloyl group. For example, the amount of these monomeric units can be in a range of 0.1 to 10 weight percent, 0.5 to 10 weight percent, 1 to 10 weight percent, 0.1 to 5 weight percent, or 0.5 to 5 weight percent based on the weight of the (meth)acrylate-based polymer having pendant (meth)acryloyl groups.

There are usually 1 to 20 pendant (meth)acryloyl groups per chain on average. There can be at least 1, at least 2, at least 3, or at least 5 and up to 20, up to 16, up to 12, up to 10, up to 8, up to 6, or up to 5 pendant (meth)acryloyl groups per chain. If there are too many pendant groups, the cured composition may be too highly crosslinked to function well as a pressure-sensitive adhesive. If there are too few groups, however, the shear strength may be too low. The number of pendant groups that can be present is dependent on the overall composition of the curable composition. That is, as the weight average molecular weight of the polymer increases, there can be more pendant (meth)acryloyl groups per chain.

The number of pendant (meth)acryloyl groups can be calculated based on the weight average molecular weight of the precursor (meth)acrylate-based polymer in grams/mole (A), the weight fraction (i.e., weight percent divided by 100) of the monomeric unit having a pendant hydroxyl group, carboxylic acid group, or anhydride group in grams (B), the mole fraction of the monomeric units having a pendant hydroxyl group, carboxylic acid group, or anhydride group that is reacted with the unsaturated reagent compound (C), and the molecular weight of the monomeric unit having a pendant hydroxyl group, carboxylic acid group, or anhydride group in grams/mole (D). More specifically, the number of (meth)acryloyl groups per chain is equal to (A)(B)(C) (D) where (A), (B), (C), and (D) are defined above.

Alternatively, the number of pendant (meth)acryloyl groups can be calculated based on the weight average molecular weight of the precursor (meth)acrylate-based polymer in grams/mole (A), the moles of unsaturated reagent compound reacted with the precursor (meth)acrylate-based polymer (E), and the amount in grams of the precursor (meth)acrylate-based polymer treated with the unsaturated reagent compound (F). More specifically, the number of (meth)acryloyl groups per chain is equal to (A)(E) (F) where (A), (E), and (F) are defined above.

In some embodiments, the (meth)acrylate-based polymer having pendant (meth)acryloyl groups contains 50 to 99.9 weight percent monomeric units derived from a (hetero) alkyl (meth)acrylate, 0.1 to 10 weight percent monomeric units having a pendant (meth)acryloyl group, and 0 to 40 weight percent monomeric units derived from a monomer having a pendant hydroxyl group, carboxylic acid group, or anhydride group, and 0 to 10 weight percent monomeric units derived from optional monomers as described above. For example, the (meth)acrylate-based polymer having pendant (meth)acryloyl groups often contains 60 to 99 weight percent monomeric units derived from a (hetero)alkyl (meth)acrylate, 0.1 to 10 weight percent monomeric units having a pendant (meth)acryloyl group, and 1 to less than 40 weight percent monomeric units derived from a monomer having a pendant hydroxyl group, carboxylic acid group, or anhydride group, and 0 to 10 weight percent monomeric units derived from optional monomers. The amount values are based on a total weight of the (meth)acrylate-based polymer having pendant (meth)acryloyl groups.

In some examples, the (meth)acrylate-based polymer having pendant (meth)acryloyl groups often contains 60 to 98 weight percent monomeric units derived from a (hetero) alkyl (meth)acrylate, 0.5 to 10 weight percent monomeric units having a pendant (meth)acryloyl group, and 1 to less than 40 weight percent monomeric units derived from a monomer having a pendant hydroxyl group, carboxylic acid group, or anhydride group, and 0 to 20 weight percent monomeric units derived from optional monomers. In other examples, the (meth)acrylate-based polymer having pendant (meth)acryloyl groups often contains 60 to 98 weight percent monomeric units derived from a (hetero)alkyl (meth) acrylate, 0.5 to 5 weight percent monomeric units having a pendant (meth)acryloyl group, and 5 to less than 40 weight percent monomeric units derived from a monomer having a pendant hydroxyl group, carboxylic acid group, or anhydride group, and 0 to 20 weight percent monomeric units derived from optional monomers.

The (meth)acrylate-based polymer having pendant (meth) acryloyl groups typically has a weight average molecular weight in a range of 25,000 Daltons to 400,000 Daltons. The weight average molecular weight is typically determined by gel permeation chromatography as described in the Examples. If the weight average molecular weight of the (meth)acrylate-based polymer having pendant (meth)acryloyl groups is less than 25,000 Daltons, the overlap shear strength of the final cured composition may be unacceptably low. If the weight average molecular weight of the (meth) acrylate-based polymer having pendant (meth)acryloyl groups is too high, however, the viscosity of the curable composition may be unacceptably high. The weight average molecular weight of the (meth)acrylate-based polymer having pendant (meth)acryloyl groups is often at least 30,000 Daltons, at least 35,000 Daltons, at least 40,000 Daltons, at least 50,000 Daltons, at least 60,000 Daltons, at least 80,000 Daltons, at least 100,000 Daltons and can be up to 400,000 Daltons, up to 375,000 Daltons, up to 350,000 Daltons, up to 325,000 Daltons, up to 300,000 Daltons, up to 275,000 Daltons, up to 250,000 Daltons, up to 200,000 Daltons, up to 175,000 Daltons, up to 150,000 Daltons, up to 125,000 Daltons, or up to 100,000 Daltons. In some embodiments, the weight average molecular weight is in a range of 35,000 to 400,000 Daltons, 50,000 to 400,000 Daltons, 35,000 to 350,000 Daltons, 50,000 to 350,000 Daltons, 35,000 to 300,000 Daltons, 50,000 to 300,000 Daltons, 35,000 to 250,000 Daltons, 50,000 to 250,000 Daltons, 35,000 to 200,000 Daltons, 50,000 to 200,000 Daltons, 35,000 to 100,000 Daltons, 50,000 to 100,000 Daltons, 35,000 to 80,000 Daltons, or 40,000 to 80,000 Daltons.

The glass transition temperature of the precursor (meth) acrylate-based polymer and/or the (meth)acrylate-based polymer having pendant (meth)acryloyl groups can be measured using the Fox equation based on the amount and identity of the monomeric units.

$$1/T_{g\ mix} = \Sigma w_i/T_{gi}$$

In this equation, $T_{g\ mix}$ refers to the glass transition temperature of the mixture of components used to form the polymer, which refers to the overall glass transition temperature of the precursor (meth)acrylate-based polymer or (meth)acrylate-based polymer having pendant (meth)acryloyl groups. $T_{gi}$ is the glass transition temperature of each component i, (i.e., each component is a different monomeric unit in the copolymer) and $w_i$ is the mass fraction of each component i. The glass transition temperature of each component (i.e., monomer) is the glass transition temperature of a homopolymer formed from that monomer. Both $T_{gi}$ and $T_{g\ mix}$ are in degrees Kelvin for purposes of the Fox equation but are often reported in degrees Celsius. Further information about the Fox equation and its use can be found in various reference texts for polymeric materials such as, for example, Hiemenz and Lodge, *Polymer Chemistry, Second Edition*, 2007, pp. 492-495. Tables of glass transition temperatures for homopolymers are available from various suppliers of monomer such as, for example, Sigma-Aldrich, Polyscience, and BASF. In most embodiments, the glass transition temperature of the precursor (meth)acrylate-based polymer as well as the glass transition temperature of the (meth)acrylate-based polymer having pendant (meth)acryloyl groups are usually no greater than 10° C., no greater than 0° C., no greater than −10° C., or no greater than −20° C. but are usually greater than −60° C., −50° C., or −40° C.

The curable composition can include multiple (meth) acrylate-based polymers that differ in weight average molecular weight and/or glass transition temperature and/or number of (meth)acryloyl groups per chain.

The curable composition typically contains 30 to 90 weight percent of the (meth)acrylate-based polymer having pendant (meth)acryloyl groups based on the total weight of the curable composition. If the amount is greater than 90 weight percent, the curable composition may be too viscous for application by printing or dispensing. If the amount is less than 30 weight percent, however, the curable composition may spread undesirably when printed or dispensed. The amount can be at least 35 weight percent, at least 40 weight percent, at least 45 weight percent, at least 50 weight percent, at least 55 weight percent, at least 60 weight percent, at least 65 weight percent, at least 70 weight percent, or at least 75 weight percent and up to 90 weight percent, up to 85 weight percent, up to 80 weight percent, or to up to 75 weight percent. In some examples, the amount is in a range of 40 to 90 weight percent, 40 to 85 weight percent, 40 to 80 weight percent, 40 to 75 weight percent, 40 to 70 weight percent, 40 to 60 weight percent, 50 to 75 weight percent, 50 to 80 weight percent, 50 to 85 weight percent, 50 to 90 weight percent, 60 to 75 weight percent, 60 to 80 weight percent, 60 to 85 weight percent, or 60 to 90 weight percent. The amounts are based on a total weight of the curable composition.

The curable composition also contains a monomer having a single ethylenically unsaturated group. Any of the monomers having a single ethylenically unsaturated group that were described above for use in preparation of the precursor (meth)acrylate-based polymer can be used. The ethylenically unsaturated group is often a (meth)acryloyl group. The monomer having a single ethylenically unsaturated group can function as a diluent for the (meth)acrylate-based polymer having pendant (meth)acryloyl groups. That is, the monomer is typically selected so that it is miscible with the polymeric material in the curable composition. The monomer can be used to adjust the viscosity of the curable composition for ease of printing and/or dispensing. That is, the monomer is added rather than adding an organic solvent or to minimize the amount of organic solvent that is added.

In some embodiments, the monomer is added after preparation of the precursor (meth)acrylate-based polymer but before reaction of the precursor (meth)acrylate-based polymer with the unsaturated reagent compound. Because the reaction with the unsaturated reagent compound often occurs at an elevated temperature, monomers that will not evaporate during this reaction are often selected. That is, the monomer is often selected to have a boiling point greater than 60° C., greater than 70° C., greater than 80° C., or greater than 90° C.

In some embodiments, the monomer added is a (hetero) alkyl (meth)acrylate. Suitable examples include, but are not limited to, various branched alkyl (meth)acrylate (e.g., 2-ethylhexyl (meth)acylate, isooctyl (meth)acrylate, and 2-octyl acrylate) or cyclic alkyl (meth)acrylates such as isobornyl (meth)acrylate, 3,3,5-trimethylcyclohexyl (meth) acrylate, cyclohexyl (meth)acrylate, and 4-tert-butylcyclohexyl (meth)acrylate.

The amount of the monomer having a single ethylenically unsaturated group in the curable composition is often in a range of 10 to 70 weight percent. If the amount is less than 10 weight percent, the viscosity of the curable composition may be too high for printing and/or dispensing. On the other hand, if the amount is greater than 70 weight percent, there may be an insufficient amount of the polymeric material present and the viscosity may be unacceptably low. In some embodiments, the amount of monomer can be at least 15 weight percent, at least 20 weight percent, at least 25 weight percent, at least 30 weight percent and up to 70 weight percent, up to 65 weight percent, up to 60 weight percent, up to 55 weight percent, up to 50 weight percent, up to 45 weight percent, up to 40 weight percent, up to 35 weight percent, up to 30 weight percent, or up to 25 weight percent. For example, the amount is in a range of 10 to 65 weight percent, 10 to 60 weight percent, 10 to 55 weight percent, 10 to 50 weight percent, 10 to 45 weight percent, 10 to 40 weight percent, 20 to 60 weight percent, 20 to 55 weight percent, 20 to 50 weight percent, 20 to 40 weight percent, 30 to 60 weight percent, or 40 to 60 weight percent. The amounts are based on the total weight of the curable composition.

In some embodiments, at least 25 weight percent of the monomers having a single ethylenically unsaturated group in the curable composition are based on renewable resources. The amount is based on the total weight of monomers having a single ethylenically unsaturated group. The amount can be at least 30 weight percent, at least 35 weight percent, at least 40 weight percent, at least 50 weight percent and up to 100 weight percent, up to 90 weight percent, up to 80 weight percent, up to 70 weight percent, up to 60 weight percent, or up to 50 weight percent.

Crosslinking monomers optionally can be added to the curable composition. Crosslinking monomers have at least two ethylenically unsaturated groups, which are typically (meth)acryloyl groups. These monomers can be added, for example, to increase the overlap shear strength of the cured composition.

Examples of crosslinking monomers with two (meth) acryloyl groups include, but are not limited to, glycerol di(meth)acrylate, hexanediol di(meth)acrylate, triethylene glycol di(meth)acrylate, 1,3-propanediol di(meth)acrylate, 1,6-hexanediol di(meth)acrylate, 1,4-cyclohexanediol di(meth)acrylate, urethane di(meth)acrylate, and polyethylene glycol di(meth)acrylates. Examples of crosslinking monomers with three (meth)acryloyl groups include, but are not limited to, glycerol tri(meth)acrylate, trimethylolpropane tri(meth)acrylate, 1,2,4-butanetriol tri(meth)acrylate, and pentaerythritol tri(meth)acrylate. Examples of crosslinking monomers with four or more (meth)acryloyl groups include, but are not limited to, pentaerythritol tetra(meth) acrylate, sorbitol hexa(meth)acrylate.

The amount of the optional crosslinking monomers is often in a range of 0 to 5 weight percent based on a total weight of the curable composition. In some embodiments, there is at least 0.01 weight percent, at least 0.05, at least 0.1 weight percent, at least 0.5 weight percent, or at least 1 weight percent and up to 5 weight percent, up to 4 weight percent, up to 3 weight percent, up to 2 weight percent, or up to 1 weight percent. In some examples, the amount of the optional crosslinking monomer is in a range of 0.01 to 5 weight percent, 0.05 to 5 weight percent, 0.05 to 2 weight percent, 0.05 to 1 weight percent, 0.1 to 5 weight percent, 0 to 1 weight percent, or 0.5 to 1 weight percent. In some embodiments, the curable composition is free of the optional crosslinking monomers.

In some embodiments, at least 25 weight percent of the monomers used to form the (meth)acrylate-based polymer having pendant (meth)acryloyl groups and/or the monomers having a single ethylenically unsaturated group in the curable composition are from a renewable resource. This amount can be at least 30 weight percent, at least 35 weight percent, at least 40 weight percent, at least 45 weight percent, or at least 50 weight percent.

A free radical photoinitiator is added to initiate curing of the curable composition. The ethylenically unsaturated groups (e.g., (meth)acryloyl groups) undergo free radical polymerization. The free radical photoinitiator contains an acyl phosphine oxide compound. The acyl phosphine oxide photoinitiators typically can be activated when exposed to actinic radiation in a range of 365 to 460 nanometers or 365 to 400 nanometers. Such photoinitiators are particularly effective for curing throughout a layer of the curable composition when exposed to light sources that emit actinic radiation. More specifically, the acyl phosphine oxide compounds often are transformed after activation by exposure to actinic radiation into a species that absorbs less of the actinic radiation (i.e., the compounds experience photobleaching). This can allow the actinic radiation to penetrate further into a layer of the curable composition. Furthermore, the polymeric materials formed using these photoinitiators is often colorless.

In many embodiments, the acyl phosphine oxide photoinitiator is a compound such as those described, for example, in U.S. Pat. No. 4,737,593 (Ellrich et al.). The acyl phosphine oxides are often of Formula (I) or (II).

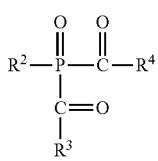

(I)

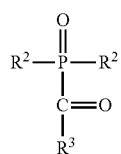

(II)

In Formulas (I) and (II), each $R^2$ is independently a linear or branched alkyl having 1 to 18 carbon atoms, a cycloalkyl having 5 to 6 ring members (i.e., cyclopentyl and cyclohexyl), a substituted cycloalkyl, an aryl (e.g., phenyl, biphenyl, and naphthyl), a substituted aryl, or a heterocyclic ring with 5 or 6 ring members and having one or more sulfur, nitrogen, or oxygen heteroatoms. Suitable substituents for substituted aryl and substituted cycloalkyl groups include halo groups (e.g., F, Cl, Br, and I), alkyl groups (e.g., alkyl groups with 1 to 10 carbon atoms, 1 to 6 carbon atoms, or 1 to 4 carbon atom), or alkoxy groups (e.g., alkoxy groups with 1 to 10 carbon atoms, 1 to 6 carbon atoms, or 1 to 4 carbon atoms).

Each $R^3$ in Formulas (I) and (II) and each $R^4$ in Formula (I) is independently a cycloalkyl having 5 to 6 ring members (i.e., cyclopentyl and cyclohexyl), a substituted cycloalkyl, an aryl (e.g., phenyl, biphenyl, and naphthyl), a substituted aryl, or a heterocyclic ring having one or more sulfur, nitrogen, or oxygen heteroatoms and having 5 or 6 ring members. Suitable substituents for substituted aryl and substituted cycloalkyl groups include halo groups (e.g., F, Cl, Br, and I), alkyl groups (e.g., alkyl groups with 1 to 10 carbon atoms, 1 to 6 carbon atoms, or 1 to 4 carbon atom), or alkoxy groups (e.g., alkoxy groups with 1 to 10 carbon atoms, 1 to 6 carbon atoms, or 1 to 4 carbon atoms). Groups $R^3$ and $R^4$ in Formula (I) can combine to form a ring that contains 4 to 10 carbon atoms that can optionally be substituted with one or more alkyl groups (e.g., 1 to 6 alkyl groups).

The acyl phosphine oxide of Formula (I) and (II) usually have at least one aromatic group. In some embodiments, the acyl phosphine is of Formula (I) where $R^2$ is aryl, $R^3$ is an aryl substituted with an alkyl or alkoxy, and $R^4$ is an aryl substituted with an alky or alkoxy. In some particular embodiments, the acyl phosphine is bis(2,4,6-trimethylbenzoyl)phenyl phosphine oxide, which is commercially available under the trade designation IRGACURE 819 from Ciba Specialty Chemicals.

In other embodiments, the acyl phosphine is of Formula (II) where each $R^2$ is any aryl and $R^3$ is an aryl substituted with an alkyl or alkoxy. For example, the acyl phosphine can be diphenyl(2,4,6-trimethylbenzoyl) phosphine oxide, which is commercially available under the trade designation TPO from Millipore Sigma (formerly Sigma Aldrich), St. Louis, Mo., USA. In still other embodiments, the acyl phosphine is of Formula (II) where a first $R^2$ is an aryl, a second $R^2$ is an alkyl, and $R^3$ is an aryl substituted with an alkyl. For example, the acyl phosphine can be ethyl(2,4,6-trimethylbenzoyl)phenyl phosphinate, which is commercially available under the trade designation TPO-L from Lambson, Wetherby, West Yorkshire, England.

The acyl phosphine oxide photoinitiator can be used alone or in combination with a second photoinitiator. The second photoinitiator can be any known photoinitiator. In some embodiments, the second photoinitiator is selected to absorb at a different wavelength range than the acyl phosphine oxide photoinitiator. For example, the second photoinitiator can be selected to absorb at a shorter wavelength than the acyl phosphine oxide photoinitiator. In some embodiments, the second photoinitiator absorbs at wavelengths less than 365 nanometers, less than 350 nanometers, less than 325 nanometers, or less than 300 nanometers. For example, the second photoinitator can be selected to absorb in a wavelength range of 240 to 300 nanometers.

In some embodiments the second photoinitiator is methyl benzoylformate or an aromatic ketone. Examples of aromatic ketones include, but are not limited to, benzophenone, acetophenone, substituted acetophenones such as 2,2-diethoxyacetophenone and 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)), a bezoin ether such as benzoin methyl ether, benzoin ethyl ether, or benzoin isopropyl ether, a substituted benzoin ether such as anisoin methyl ether, and a substituted alpha-ketol such as -methyl-2-hydroxypropiophenone. Other aromatic ketones include, for example, 1-hydroxycyclohexyl phenyl ketone (IRGACURE 184), 1-[4-(2-hydroxyethoxy)phenyl]-2-hydroxy-2-methyl-1-propane-1-one (IRGACURE 2959), 2-hydroxy-2-methyl-1-phenyl propan-1-one (DAROCUR 1173), and various amino-substituted aromatic ketones such as alkylamino acetophenones (e.g., 2-benzyl-2-dimethylamino-1-(4-morpholinophenyl)butanone (IRGACURE 369) and 2-methyl-1-[4-(methylthio)phenyl]-2-morpholinopropan-1-one (IRGACURE 907)).

Polymeric photoinitiators having the desired activation group can also be used. For examples, photoinitiators with an acyl phosphine oxide group, with an aromatic ketone group, or with a phenylglyoxylate group can be used. Such photoinitiators often have less odor and are less likely to migrate within the final cured composition.

In some curable composition, the second photoinitiator is methyl benzoylformate (i.e., methyl phenylglyoxylate). The photoinitiator can absorb ultraviolet radiation in a wavelength range of 240 to 300 nanometers. Actinic radiation in this shorter wavelength range tends to be effective for curing near the surface layer of the curable composition.

DOUBLECURE TPO-L is a commercially available mixture of diphenyl(2,4,6-trimethylbenzoyl) phosphine oxide and methyl benzoylformate from Double Bond Chemical Ind., Co., Ltd. (New Taipei City, Taiwan).

The total amount of the photoinitiator is often in a range of 0.1 to 10 weight percent based on a total weight of the curable composition. The amount of the photoinitiator can impact the speed of the curing (i.e., polymerization) reaction. The amount is often at least 0.2 weight percent, at least 0.5 weight percent, at least 1 weight percent, at least 2 weight percent, or at least 3 weight percent and up to 10 weight percent, up to 8 weight percent, up to 6 weight percent, or up to 5 weight percent. The amount is often in a range of 0.5 to 10 weight percent, 1 to 10 weight percent, 2 to 10 weight percent, 0.5 to 8 weight percent, 1 to 8 weight percent, 1 to 6 weight percent, 2 to 8 weight percent, 2 to 6 weight percent, or 4 to 6 weight percent.

If the photoinitiator includes a first photoinitiator and a second photoinitiator that absorbs at shorter wavelengths than the first photoinitiator, the photoinitiator often includes at least 10 weight percent, at least 15 weight percent, at least 20 weight percent, or at least 25 weight percent of each photoinitiator based on the total weight of photoinitiator. For example, the photoinitiator contains 10 to 90 weight percent of the first photoinitiator and 10 to 90 weight percent of the second photoinitiator, 20 to 80 weight percent of the first photoinitiator and 20 to 80 weight percent of the second photoinitiator, 25 to 75 weight percent of the first photoinitiator and 25 to 75 weight percent of the second photoinitiator, 50 to 90 weight percent of the first photoinitiator and 10 to 50 weight percent of the second photoinitiator, or 50 to 75 weight percent of the first photoinitiator and 25 to 50 weight percent of the second photoinitiator.

The curable composition further includes a thixotropic agent. The thixotropic agent contains inorganic oxide particles that are optionally treated with a surface modification agent. The thixotropic agent is added to adjust the viscosity of the curable composition. For example, the thixotropic agent is added to facilitate printing or dispensing of the curable composition.

Any inorganic oxide particles that functions as a thixotropic agent can be used. As used herein, a composition is thixotropic if the viscosity decreases when the composition is subjected to a shearing stress over a given time with subsequent recovery or partial recovery of viscosity when the shearing stress is decreased or removed. The advantage of the thixotropic behavior is that the composition can be dispensed or printed more easily. That is, the curable composition can have decreased viscosity during dispensing or printing, but the viscosity can increase significantly after being dispersed or printed. The increased viscosity helps keep the printed or dispensed composition from spreading undesirably.

The selection of the thixotropic inorganic oxide particles is often based on the final use and performance requirements of the cured composition. In some instances, the selection can be based on the desired color, light transmission, and haze of the cured composition. The inorganic oxide particles are often silicon oxide (e.g., silica), zirconium oxide, titanium oxide, aluminum oxide, clay, boron nitride, and the like. The average diameter of the inorganic oxide particles is often selected so that the particles do not settle from the composition under normal gravitational forces. The average diameter is often no greater than 500 nanometers, no greater than 400 nanometers, no greater than 300 nanometers, no greater than 200 nanometers, or no greater than 100 nanometers. The average diameter is often at least 10 nanometers, at least 20 nanometers, at least 50 nanometers, or at least 100 nanometers. The average diameter can be determined using techniques such as electron microscopy based on image analysis of at least several hundred particles.

In some embodiments, the inorganic oxide is a silicon oxide such as, for example, fumed silica. Suitable fumed silicas include, for example, those available under the trade designation AEROSIL from Evonik Industries, under the trade designations CAB-O-SIL and CAB-O-SPERSE from Cabot Corporation, and under the trade designation HDK (e.g., HDK H18, which is a fumed silica that has been surface treated with a hydrophobic surface modifier) from Wacker Chemie AG. In other embodiments, the inorganic oxide is fumed aluminum oxide such as those available, for example, under the trade designation AEROXIDE from Evonik Industries. In still other embodiments, the inorganic oxide is clay such as those available under the trade designation GARAMITE from Southern Clay Products.

If desired, the inorganic oxide particles can be treated with a surface modification agent to increase compatibility with the polymerized and polymerizable composition. The surface modification agent can be hydrophobic or hydrophilic. Suitable surface modification agents are often silanes, siloxanes, carboxylic acids, phosphonic acids, and the like.

In some embodiments, the inorganic oxide particle is treated with a hydrophobic surface modification agent to be enhance compatibility with the monomers in the curable composition. Suitable surface treatment agents include, for example, various silanes with at least one hydrolyzable group such as alkoxy groups and with at least one alkyl group having 1 to 20 carbon atoms. The hydrolyzable alkoxy group often has 1 to 4 carbon atoms, 1 to 3 carbon atoms, or 1 to 2 carbon atoms. There can be 1 to 3 alkoxy groups and 1 to 3 alkyl groups with the sum of the alkoxy and alkyl groups being equal to 4. Stated differently, the silane is of formula $Si(R^5)_t(R^6)_{4-t}$ where the variable t is equal to 1, 2, or 3 and both $R^5$ is an alkoxy and $R^6$ is an alkyl. A mixture of silanes can be used. For example, a mixture of a first silane having an alkyl group with 10 to 20 carbon atoms and a second silane having an alkyl group with 1 to 9 carbon atoms can be used. A combination of short and long chains tends to increase the overall coverage of the inorganic oxide particles with the hydrophobic groups.

The thixotropic agent is usually either inorganic oxide particles or a surface modified inorganic oxide particle. Such thixotropic agents often contain 50 to 100 weight percent inorganic oxide particles and 0 to 50 weight percent surface treatment. In some embodiments, the thixotropic agent is at least 50 weight percent, at least 55 weight percent, at least 60 weight percent, at least 65 weight percent, at least 70 weight percent, at least 75 weight percent, at least 80 weight percent, at least 85 weight percent, at least 90 weight percent, at least 95 weight percent, or at least 99 weight percent inorganic oxide particles with the remainder being the surface treatment. The amounts are based on the total weight of the thixotropic agent.

The amount of the thixotropic agent is typically in a range of 1 to 15 weight percent based on a total weight of the curable composition. If the amount is less than 1 weight percent, the curable composition may not be thixotropic, and the viscosity may be too low (i.e., the composition may be too runny after being dispensed or printed). If the amount is greater than 15 weight percent, however, the viscosity may be too high. Further, the inorganic oxide particles may not be miscible with the other components of the curable composition and may settle out or form a particle network. The amount of the thixotropic agent is often at least 1 weight percent, at least 2 weight percent, at least 3 weight percent, or at least 5 weight percent and up to 15 weight percent, up to 12 weight percent, up to 10 weight percent, up to 8 weight percent, up to 6 weight percent, or up to 5 weight percent. The amount is based on the total weight of the curable composition.

The curable composition usually contains 30 to 90 weight percent of the (meth)acrylate-based polymer having pendant (meth)acryloyl groups, 10 to 70 weight percent monomers having a single ethylenically unsaturated group, 0.1 to 10 weight percent photoinitiator, and 1 to 15 weight percent thixotropic agent based on a total weight of the curable composition. In some embodiments, the curable composition contains 40 to 90 weight percent of the (meth)acrylate-based polymer having pendant (meth)acryloyl groups, 10 to 60 weight percent monomers having a single ethylenically unsaturated group, 0.1 to 10 weight percent photoinitiator, and 1 to 15 weight percent thixotropic agent based on a total weight of the curable composition. In some embodiments the curable composition contains 30 to 80 weight percent of the (meth)acrylate-based polymer having pendant (meth) acryloyl groups, 20 to 70 weight percent monomers having a single ethylenically unsaturated group, 1 to 10 weight percent photoinitiator, and 1 to 10 weight percent thixotropic agent or the curable composition contains 40 to 80 weight percent of the (meth)acrylate-based polymer having pendant (meth)acryloyl groups, 20 to 60 weight percent monomers having a single ethylenically unsaturated group, 1 to 10 weight percent photoinitiator, and 1 to 10 weight percent thixotropic agent. In yet other embodiments, the curable composition contains 40 to 70 weight percent of the (meth) acrylate-based polymer having pendant (meth)acryloyl groups, 30 to 60 weight percent monomers having a single ethylenically unsaturated group, 1 to 10 weight percent photoinitiator, and 1 to 10 weight percent thixotropic agent. In still other embodiments, the curable composition contains 40 to 60 weight percent of the (meth)acrylate-based polymer having pendant (meth)acryloyl groups, 40 to 60 weight percent monomers having a single ethylenically unsaturated group, 1 to 10 weight percent photoinitiator, and 1 to 5 weight percent thixotropic agent.

If desired, tackifiers can be added to the curable composition used to form pressure-sensitive adhesives compositions. Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used, if desired. Any desired amount of tackifier can be used depending on the use of the pressure-sensitive adhesive. In some embodiments, the amount of tackifier is in a range of 0 to 100 parts per 100 parts of the polymeric material (e.g., the polymeric material usually includes the (meth)acrylate-based polymer having pendant (meth)acryloyl groups plus the monomers included in the curable composition). For example, the amount of the tackifier can be 0 to 80 parts, 0 to 60 parts, 0 to 40 parts, or 0 to 20 parts per 100 parts of the polymeric material.

Other optional components can be included in the curable composition as described above. Examples of optional components include, but are not limited to, pigments, dyes, colorants, defoamers, surfactants, scents, antistatic agents, electrically conductive particles, thermally conductive particles, nanoparticles, thickeners, fibers, processing aids, expandable microspheres, and the like. Any suitable amount of these optional components can be used such as, for example, 0 to 20 parts per 100 parts of the polymeric material. For example, the amount of any optional component can be 0 to 15 parts, 0 to 10 parts, 0 to 5 parts, 0 to 3 parts, 0 to 2 parts, or 0 to 1 parts per 100 parts of the polymeric material.

Further, if desired, an organic solvent can be added to control the viscosity of the curable composition. In many embodiments, no organic solvent (i.e., the curable composition is free of organic solvent) or only a minimum amount of the organic solvent is added. The amount of organic solvent can be up to 60 weight percent or even higher based on a total weight of the curable composition. The amount of organic solvent can be up to 50 weight percent, up to 40 weight percent, up to 30 weight percent, up to 20 weight percent, up to 10 weight percent, or up to 5 weight percent. In some embodiments, it is desirable to keep the content of organic solvent as low as possible. Any organic solvent used in the curable composition is typically removed at the completion of the curing (i.e., polymerization) reaction. Suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof.

The curable composition is typically free or substantially free of an epoxy resin. As used herein with reference to the epoxy resin, "substantially free" means that the curable composition contains less than 1 weight percent, less than 0.5 weight percent, less than 0.2 weight percent, less than 0.1 weight percent, less than 0.05 weight percent, less than 0.02 weight percent, or less than 0.01 weight percent epoxy resin based on the total weight of the curable composition.

Cured compositions can be prepared by exposing the curable compositions to actinic radiation. To form a cured composition, the curable composition is often applied to a substrate and then exposed to actinic radiation. Any suitable substrate can be used. Stated differently, an article is provided that includes a first substrate and a curable composition layer positioned adjacent the first substrate. The curable composition can be positioned in any desired pattern or as a continuous layer. Patterns can be regular or irregular and of any desired size, shape, or design. Any of the curable composition described above can be used.

The curable composition can be positioned adjacent to the substrate using any suitable process such as, for example, flow coating, dip coating, spray coating, knife coating, die coating, extrusion, printing, or dispensing. Once positioned adjacent to the substrate, the curable coating is exposed to actinic radiation to react the curable composition and form the cured composition.

In some embodiments, the curable composition is printed or dispensed. The curable composition can typically be printed or dispensed onto a substrate. In many embodiments, the curable composition can be printed or dispensed into a pattern on the substrate. To be printed or dispensed, the desired viscosity of the curable composition depends on several variables such as the amount of the (meth)acrylate-based polymer having pendant (meth)acryloyl groups, the weight average molecular weight of this polymer, the amount of the monomer having a single ethylenically unsaturated group, the amount of the thixotropic agent, and the amount of any optional organic solvent. As the molecular weight of the polymeric material increases, a lower amount of the polymeric material will be needed. Further, as the weight average molecular weight of the polymeric material increases, the likelihood of undesirable stringing of the curable composition can result upon printing or dispensing. As the weight average molecular weight of the polymeric material decreases, however, larger amounts can be used before the viscosity of the curable composition becomes unacceptably high.

For use in printing or dispensing applications, the curable composition often has a Trouton's ratio in a range of 3 to 25 at a rate (i.e., extensional rate) of 1000 $sec^{-1}$. The Trouton's ratio is the extensional viscosity divided by the shear viscosity. If the Trouton's ratio is greater than 25 (i.e., if the extensional viscosity is too high relative to the shear viscosity), the curable composition has an increased tendency towards stringing upon printing or dispensing. That is, the curable composition may be too elastic in nature and stringing can result that can cause poor pattern quality or strings of curable composition landing on substrate in areas not intended. In some embodiments, the Trouton's ratio is at least 4, at least 5, at least 6, at least 8, or at least 10 and can be up to 25, up to 22, up to 20, up to 18, up to 16, up to 15, up to 14, or up to 12. In some embodiments, the Trouton's ratio is in a range of 3 to 20, 3 to 15, 3 to 10, 5 to 25, 5 to 20, 5 to 15, 10 to 25, or 10 to 20.

Printing or dispensing the curable composition advantageously eliminates the need to die cut the cured composition layer to get the desired size and shape. Die cutting can create undesirable waste because the trimmed material often need to be discarded. Additionally, some soft or compliant cured composition layers may be difficult to cleanly die cut. That is, the layers may deform or flow when die cut.

The curable composition can be exposed to actinic radiation having a UVA maximum in a range of 250 to 475 nanometers. Ultraviolet light sources can be of various types. Low light intensity lights such as black lights, generally provide intensities ranging from 0.1 or 0.5 mW/cm$^2$ (milliWatts per square centimeter) to 10 mW/cm$^2$ (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 100, 500 or 1000 mW/cm2 or greater. In some embodiments, high intensity light sources provide intensities up to 1, 10 or 20 W/cm$^2$. Light to polymerize the monomer component(s) can be provided by various light sources such as light emitting diodes (LEDs), black lights, medium pressure mercury lamps, etc. or a combination thereof. The monomer component(s) can also be polymerized with higher intensity light sources as available from Heraeus UV Systems Inc. The exposure time for curing can vary depending on the intensity of the light source(s) used. Further, the wavelength of the light can affect curing because longer wavelengths tend to pass further into the curable composition.

The curable composition can be positioned on or adjacent to any suitable substrate to provide a first article. That is, the first article contains a substrate and a layer of a curable composition adjacent to the substrate. The curable compositions are any of those described above. The curable composition layer can contact the substrate or be separated from the substrate by another layer such as, for example, a primer layer. The curable composition can be in a form of a continuous or discontinuous layer.

The substrate can be flexible or inflexible and can be formed from a polymeric material, glass or ceramic material, metal, or combination thereof. Some substrates are polymeric films such as those prepared from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose). Other substrates are metal foils, nonwoven materials (e.g., paper, cloth, nonwoven scrims), foams (e.g., polyacrylic, polyethylene, polyurethane, neoprene), and the like. For some substrates, it may be desirable to treat the surface to improve adhesion to the curable composition, cured composition, or both. Such treatments include, for example, application of primer layers, surface modification layer (e.g., corona treatment or surface abrasion), or both.

In some embodiments, the substrate is a release liner. Release liners typically have low affinity for the curable composition and/or cured composition. Exemplary release liners can be prepared from paper (e.g., Kraft paper) or other types of polymeric material. Some release liners are coated with an outer layer of a release agent such as a silicone-containing material or a fluorocarbon-containing material.

The curable composition can be positioned next to a substrate using a roll-to-roll process. That is, the substrate can be moved from a first roll to a second roll in a continuous process. As the substrate moves between the first roll and the second roll, it can be coated with the curable composition. Such a substrate can be regarded as being a web and the web is often a polymeric material (e.g., a polymeric film) such as those described above. The polymeric web can be unrolled from a first roll, coated with the curable composition, exposed to actinic radiation for crosslinking, and then rolled onto the second roll.

The curable composition coating can have any desired thickness that can be effectively cured when exposed to actinic radiation. In many embodiments, the curable composition coating has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness is often at least 0.5 mils (12.5 micrometers) or at least 1 mil (25 micrometers). For example, the thickness of the curable composition coating can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

The curable composition is reacted to form a cured composition by exposure to actinic radiation (e.g., radiation in the ultraviolet and/or visible region of the electromagnetic spectrum). That is, a second article is provided that contains a substrate and a layer of a cured composition adjacent to the substrate. The cured composition is the cured (i.e., polymerized) reaction product of any of the curable compositions described above. The cured composition layer can contact the substrate or be separated from the substrate by another layer such as, for example, a primer layer. The cured composition can be in a form of a continuous or discontinuous layer.

The cured composition typically is elastomeric and is a pressure-sensitive adhesive. Thus, articles (i.e., second articles) having a substrate and a pressure-sensitive adhesive layer adjacent to the substrate are provided. The pressure-sensitive adhesive layer can be continuous or patterned. The substrate can be selected depending on the specific application. For example, the substrate can be a sheeting material and the resulting article can provide decorative graphics or can be a reflective product. In other examples, the substrate can be label stock (the resulting article is a label with an adhesive layer), a tape backing (the resulting article is an adhesive tape), or a foam.

In yet other examples, the substrate can be a release liner and the resulting article (i.e., second article) can be an adhesive transfer tape. The adhesive transfer tape can be used to transfer the pressure-sensitive adhesive layer to another substrate or surface. Other substrates and surfaces include, for example, a panel (e.g., a metal panel such as an automotive panel), a glass window, or a component of an electronic display.

Adhesive transfer tapes typically have a single pressure-sensitive adhesive layer adjacent to the release liner. Preferably, the extent of curing is relatively uniform throughout the thickness of the pressure-sensitive adhesive layer and the peel adhesive strength of each major surface towards a given substrate (e.g., stainless steel) varies by no more than 30 percent, no more than 20 percent, no more than 15 percent, no more than 10 percent, or no more than 5 percent. This difference can be controlled, for example, by the amount of oxygen present during curing, the photoinitiator composition selected, the intensity of the light source that is used for curing, and the wavelengths emitted by the light source.

Further, the pressure-sensitive adhesive has a shear strength that is at least 10,000 minutes when adhered to stainless steel. Preferably, the shear strength of each major surface of the pressure-sensitive adhesive layer of an adhesive transfer tape is at least 10,000 minutes when adhered to stainless steel.

While curing can occur in both an inert (e.g., nitrogen atmosphere) or in an ambient atmosphere (e.g., air), an inert atmosphere is often selected if the photoinitiator includes only an acyl phosphine oxide compound. That is, if the photoinitiator includes a first photoinitiator that is an acyl phosphine oxide compound but not a second photoinitiator that is activated at shorter wavelengths (e.g., in a wavelength no greater than 300 nanometers such as in a range of 240 to 300 nanometers), then curing in an inert atmosphere is often preferred. For example, nitrogen can be used to displace oxygen such that the oxygen levels are less than 200 ppm, less than 100 ppm, or less than 50 ppm during curing. In the inert atmosphere, the curing composition can typically be effectively cured through the entire thickness. If the curing reaction occurs in air (i.e., in an ambient atmosphere), however, the major surface of the resulting pressure-sensitive adhesive layer opposite the release liner (e.g., the exposed surface) may not be sufficiently cured. Alternatively, if the major surface of the resulting pressure-sensitive adhesive layer opposite the release liner is sufficiently cured in air, the major surface of the resulting pressure-sensitive adhesive layer adjacent to the release liner may be over cured.

If the photoinitiator includes a first photoinitiator that is an acyl phosphine oxide compound plus a second photoinitiator that is activated at shorter wavelengths (e.g., in a wavelength range of 240 to 300 nanometers), then curing can effectively occur in either an inert atmosphere or in an ambient atmosphere. The second photoinitiator can be, for example, an aromatic ketone or methyl benzoylformate. The curing reaction can occur under ambient conditions without the need to exclude oxygen.

Many commonly used LED light sources for use in the ultraviolet region of the electromagnetic spectrum emit light in a range of 365 to 460 nanometers. These light sources can activate the first photoinitiator (i.e., the acyl phosphine oxide photoinitiator) but not the second photoinitiator that absorbs in a wavelength range of 240 to 300 nanometers. Thus, when LED light sources are used, curing often is preferably performed under an inert atmosphere and the photoinitiator often includes only the first photoinitiator.

Other UV light sources that are not light emitting diodes tend to emit over a broader wavelength range. These light sources that emit over a broader spectrum can be used advantageously in combination with a photoinitiator mixture that includes a first photoinitiator that absorbs at a longer wavelength of the UV region of the electromagnetic spectrum and a second photoinitiator that absorbs at a shorter wavelength of the UV region of the electromagnetic spectrum. The longer wavelengths (such as those in a wavelength range of 365 to 460 nanometers) are more effective than the shorter wavelengths for curing throughout the entire curable composition. The shorter wavelengths (such as those in a wavelength range of 240 to 300 nanometers), however, are particularly effective at curing the outer surface of the curable composition opposite the release liner (and nearer to the light source). With the mixture of photoinitiators used, the curing reaction can occur in an ambient atmosphere, if desired.

Some articles are adhesive tapes. The adhesive tapes can be single-sided adhesive tapes with the curable composition attached to a single side of the tape backing or can be a double-sided adhesive tape with a pressure-sensitive adhesive layer on both major surfaces of the tape backing. At least one of the two pressure-sensitive adhesive layers is the curable composition described above. Double-sided adhesive tapes are often carried on a release liner.

Various embodiments are provided that include a curable composition, cured composition, articles, and methods of making articles.

Embodiment 1A is a curable composition that contains (a) a (meth)acrylate-based polymer having pendant (meth)acryloyl groups and having a weight average molecular weight in a range of 25,000 to 400,000 Daltons, (b) at least one monomer having a single ethylenically unsaturated group, (c) a photoinitiator comprising an acyl phosphine oxide, and (d) a thixotropic agent comprising inorganic oxide particles. The curable composition is free or substantially free of an epoxy resin.

Embodiment 2A is the curable composition of embodiment 1A, wherein the (meth)acrylate-based polymer having pendant (meth)acryloyl groups is a reaction product of a precursor (meth)acrylate-based polymer having pendant hydroxyl groups, pendant carboxylic acid groups, or pendant anhydride groups and an unsaturated reagent compound having a (meth)acryloyl group plus a complementary group that is capable or reacting with the pendant hydroxyl groups, pendant carboxylic groups, or pendant anhydride groups.

Embodiment 3A is the curable composition of embodiment 2A, wherein the precursor (meth)acrylate-based polymer has pendant hydroxyl groups and the unsaturated reagent compound has a complementary group that is a carboxylic acid group, isocyanato group, epoxy group, or anhydride group.

Embodiment 4A is the curable composition of embodiment 3A, wherein the unsaturated reagent compound is isocyanatoethyl (meth)acrylate.

Embodiment 5A is the curable composition of embodiment 3A, wherein the unsaturated reagent compound is glycidyl (meth)acrylate.

Embodiment 6A is the curable composition of any one of embodiments 2A to 5A, wherein the precursor (meth)acrylate-based polymer comprises 50 to 99.9 weight percent monomeric units derived from (hetero)alkyl (meth)acrylate monomers, 0.1 to 40 weight percent monomeric units derived from a second monomer having an ethylenically unsaturated group (e.g., a (meth)acryloyl groups) and a functional group that is a carboxylic acid group, isocyanato group, epoxy group, or anhydride group, wherein the amounts are based on a total weight of the precursor (meth)acrylate-based polymer.

Embodiment 7A is the curable composition of embodiment 6A, wherein the second monomer has a (meth)acryloyl group and a hydroxyl group and the precursor (meth)acrylate polymer has pendant hydroxyl groups.

Embodiment 8A is the curable composition of any one of embodiments 1A to 7A, wherein the (meth)acrylate-based polymer having pendant (meth)acryloyl groups further comprises monomeric units having a pendant hydroxyl group.

Embodiment 9A is the curable composition of any one of embodiments 1A to 8A, wherein the (meth)acrylate-based polymer having pendant (meth)acryloyl group comprises 50 to 99.9 weight percent monomeric units derived from a (hetero)alkyl (meth)acrylate, 0.1 to 10 weight percent monomeric units having a pendant (meth)acryloyl group, 0 to 40 weight percent monomeric units having a pendant hydroxyl group, carboxylic acid group, or anhydride group, and 0 to 20 weight percent monomeric units derived from optional monomers. The amount values are based on a total weight of the (meth)acrylate-based polymer having pendant (meth)acryloyl groups.

Embodiment 10A is the curable composition of embodiment 9A, wherein the (meth)acrylate-based polymer having pendant (meth)acryloyl group comprises 60 to 98 weight percent monomeric units derived from a (hetero)alkyl (meth)acrylate, 0.5 to 5 weight percent monomeric units having a pendant (meth)acryloyl group, 5 to less than 40 weight percent monomeric units having a pendant hydroxyl group, carboxylic acid group, or anhydride group, and 0 to 20 weight percent monomeric units derived from optional monomers.

Embodiment 11A is the curable composition of any one of embodiments 1A to 10A, wherein the (meth)acrylate-based polymer having pendant (meth)acryloyl groups has 1 to 20 pendant (meth)acryloyl groups per chain on average.

Embodiment 12A is the curable composition of any one of embodiments 1A to 11A, wherein the (meth)acylate-based polymer has a weight average molecular weight in a range of 35,000 to 100,000 Daltons or in a range of 40,000 to 80,000 Daltons.

Embodiment 13A is the curable composition of any one of embodiments 1A to 12A, wherein the curable composition comprises 30 to 90 weight percent of the (meth)acrylate-based polymer having pendant (meth)acryloyl groups based on a total weight of the curable composition.

Embodiment 14A is the curable composition of any one of embodiments 1A to 13A, wherein the monomer having the single ethylenically unsaturated group has a boiling point greater than 60° C. or greater than 80° C.

Embodiment 15A is the curable composition of any one of embodiments 1A to 14A, wherein the curable composition comprises 10 to 70 weight percent of the monomer having the single ethylenically unsaturated group.

Embodiment 16A is the curable composition of any one of embodiments 1A to 15A, wherein the acyl phosphine oxide has an aromatic group.

Embodiment 17A is the curable composition of any one of embodiments 1A to 16A, wherein the photoinitiator further comprises a second photoinitiator that absorbs actinic radiation at wavelengths less than 300 nanometers.

Embodiment 18A is the curable composition of embodiment 17A, wherein the second photoinitiator absorbs actinic radiation at wavelengths in a range of 240 to 300 nanometers.

Embodiment 19A is the curable composition of embodiment 17A or 18A, wherein the second photoinitiator is methyl benzoylformate or an aromatic ketone.

Embodiment 20A is the curable composition of any one of embodiments 1A to 19A, wherein the photoinitiator is a mixture of diphenyl (2,4,6-trimethylbenzoyl) phosphine oxide (i.e., the first photoinitiator) and methyl benzoylformate (i.e., the second photoinitiator).

Embodiment 21A is the curable composition of any one of embodiments 1A to 20A, wherein the curable composition comprises 0.1 to 10 weight percent photoinitiator based on a total weight of the curable composition.

Embodiment 22A is the curable composition of any one of embodiments 1A to 21A, wherein the thixotropic agent comprises silica.

Embodiment 23A is the curable composition of any one of embodiments 1A to 22A, wherein the thixotropic agent comprises an inorganic oxide that is treated with a surface modifying agent.

Embodiment 24A is the curable composition of any one of embodiments 1A to 23A, wherein the thixotropic agent is hydrophobic.

Embodiment 25A is the curable composition of any one of embodiments 1A to 24A, wherein the curable composition comprises 1 to 15 weight percent thixotropic agent based on a total weight of the curable composition.

Embodiment 26A is the curable composition of any one of embodiments 1A to 25A, wherein the curable composition comprises 30 to 90 weight percent of the (meth)acrylate-based polymer having pendant (meth)acryloyl groups, 10 to 70 weight percent monomers having a single ethylenically unsaturated group, 0.1 to 10 weight percent photoinitiator, and 1 to 15 weight percent thixotropic agent based on a total weight of the curable composition.

Embodiment 27A is the curable composition of any one of embodiments 1A to 26A, wherein the curable composition comprises 40 to 90 weight percent of the (meth)acrylate-based polymer having pendant (meth)acryloyl groups, 10 to 60 weight percent monomers having a single ethylenically unsaturated group, 0.1 to 10 weight percent photoinitiator, and 1 to 15 weight percent thixotropic agent based on a total weight of the curable composition.

Embodiment 28A is the curable composition of any one of embodiments 1A to 27A, wherein the curable composition comprises 40 to 80 weight percent of the (meth)acrylate-based polymer having pendant (meth)acryloyl groups, 20 to 60 weight percent monomers having a single ethylenically unsaturated group, 0.1 to 10 weight percent photoinitiator, and 1 to 10 weight percent thixotropic agent based on a total weight of the curable composition.

Embodiment 29A is the curable composition of any one of embodiments 1A to 28A, wherein the curable composition comprises 40 to 70 weight percent of the (meth)acrylate-based polymer having pendant (meth)acryloyl groups, 30 to 60 weight percent monomers having a single ethylenically unsaturated group, 0.1 to 10 weight percent photoinitiator, and 1 to 10 weight percent thixotropic agent based on a total weight of the curable composition.

Embodiment 30A is the curable composition of any one of embodiments 1A to 29A, wherein the curable composition is printable or dispensable.

Embodiment 31A is the curable composition of any one of embodiments 1A to 30A, wherein the curable composition has a Trouton's ratio (ratio of the extensional viscosity to shear viscosity) in a range of 3 to 25 with an extensional rate of 1000 $sec^{-1}$.

Embodiment 32A is the curable composition of any one of embodiments 1A to 31A, wherein at least 25 weight percent of the monomers used to form the (meth)acrylate-based polymer having pendant (meth)acryloyl groups and/or the monomers having a single ethylenically unsaturated group in the curable composition are from a renewable resource.

Embodiment 33A is the curable composition of embodiment 32A, wherein at least 50 weight percent of the monomers used to form the (meth)acrylate-based polymer having pendant (meth)acryloyl groups and/or the monomers having a single ethylenically unsaturated group in the curable composition are from a renewable resource.

Embodiment 1B is a cured composition that is a polymerized reaction product of a curable composition. The curable composition contains (a) a (meth)acrylate-based polymer having pendant (meth)acryloyl groups and having a weight average molecular weight in a range of 25,000 to 400,000 Daltons, (b) at least one monomer having a single ethylenically unsaturated group, (c) a photoinitiator comprising an acyl phosphine oxide, and (d) a thixotropic agent comprising inorganic oxide particles. The curable composition is free or substantially free of an epoxy resin. The cured composition is formed by exposing the curable composition to actinic radiation.

Embodiment 2B is the cured composition of embodiment 1B, wherein the curable composition is any one of embodiments 2A to 33A.

Embodiment 3B is the cured composition of embodiment 1B or 2B, wherein the cured composition is a pressure-sensitive adhesive.

Embodiment 1C is a first article that includes a substrate and a curable composition adjacent to the substrate. The curable composition contains (a) a (meth)acrylate-based polymer having pendant (meth)acryloyl groups and having a weight average molecular weight in a range of 25,000 to 400,000 Daltons, (b) at least one monomer having a single ethylenically unsaturated group, (c) a photoinitiator comprising an acyl phosphine oxide, and (d) a thixotropic agent comprising inorganic oxide particles. The curable composition is free or substantially free of an epoxy resin. The curable composition can be in a form of a continuous or discontinuous layer.

Embodiment 2C is the first article of embodiment 1C, wherein the curable composition is any one of embodiments 2A to 33A.

Embodiment 3C is the first article of embodiment 1C or 2C, wherein the substrate is a release liner.

Embodiment 4C is the first article of embodiment 1C or 2C, wherein the substrate is a polymeric film.

Embodiment 1D is a second article that includes a substrate and a cured composition adjacent to the substrate. The cured composition is a polymerized reaction product of a curable composition. The curable composition contains (a) a (meth)acrylate-based polymer having pendant (meth)acryloyl groups and having a weight average molecular weight in a range of 25,000 to 400,000 Daltons, (b) at least one monomer having a single ethylenically unsaturated group, (c) a photoinitiator comprising an acyl phosphine oxide, and (d) a thixotropic agent comprising inorganic oxide particles. The curable composition is free or substantially free of an epoxy resin. The cured composition is formed by exposing the curable composition to actinic radiation and can be in a form of a continuous or discontinuous layer.

Embodiment 2D is the second article of embodiment 1D, wherein the curable composition is any one of embodiments 2A to 33A.

Embodiment 3D is the second article of embodiment 1D or 2D, wherein the cured composition is a pressure-sensitive adhesive.

Embodiment 4D is the second article of any one of embodiments 1D to 3D, wherein the substrate is a release liner.

Embodiment 5D is the second article of embodiment 4D, wherein the second article is an adhesive transfer tape.

Embodiment 6D is the second article of any one of embodiments 3D to 5D, wherein the substrate is a release liner and the cured composition is a pressure-sensitive adhesive having a first major surface adjacent to the release liner and a second major surface opposite the release liner, the first major surface having a peel strength within 30 percent of a peel strength of the second major surface.

Embodiment 7D is the second article of embodiment 6D, wherein the first major surface has a peel strength within 20 percent or 10 percent of the peel strength of the second major surface.

Embodiment 8D is the second article of embodiment 3D to 5D, wherein the second article is a transfer tape, wherein the substrate is a release liner and the cured composition is a pressure-sensitive adhesive having a first major surface adjacent to the release liner and a second major surface opposite the release liner, the first major surface and the second surface have a shear adhesive strength of at least 10,000 minutes when adhered to stainless steel.

Embodiment 9D is the second article of embodiment 8D, wherein the first major surface has a peel strength within 30 percent of the peel strength of the second major surface.

Embodiment 10D is the second article of embodiment 9D, wherein the first major surface has a peel strength within 20 percent or 10 percent of the peel strength of the second major surface.

Embodiment 11D is the second article of any one of embodiments 1D to 3D, wherein the substrate is a polymeric film.

Embodiment 1E is a method of making a first article. The method includes providing a curable composition that contains (a) a (meth)acrylate-based polymer having pendant (meth)acryloyl groups and having a weight average molecular weight in a range of 25,000 to 400,000 Daltons, (b) at least one monomer having a single ethylenically unsaturated group, (c) a photoinitiator comprising an acyl phosphine oxide, and (d) a thixotropic agent comprising inorganic oxide particles. The curable composition is free or substantially free of an epoxy resin. The method further includes applying the curable composition adjacent to a surface of a substrate, wherein applying comprises positioning the curable composition in the form of a continuous or discontinuous layer.

Embodiment 2E is the method of embodiment 1E, wherein the curable composition is any one of embodiments 2A to 33A.

Embodiment 3E is the method of embodiment 1E or 2E, wherein the substrate is a release liner.

Embodiment 4E is the method of embodiment 1E or 2E, wherein the substrate is a polymeric film.

Embodiment 5E is the method of any one of embodiments 1E to 4E, wherein applying comprises printing or dispensing the curable composition.

Embodiment 6E is the method of embodiment 5E, wherein applying comprises screen printing or stencil printing.

Embodiment 1F is a method of making a second article. The method includes providing a curable composition that contains (a) a (meth)acrylate-based polymer having pendant (meth)acryloyl groups and having a weight average molecular weight in a range of 25,000 to 400,000 Daltons, (b) at least one monomer having a single ethylenically unsaturated group, (c) a photoinitiator comprising an acyl phosphine oxide, and (d) a thixotropic agent comprising inorganic oxide particles. The curable composition is free or substantially free of an epoxy resin. The method further includes applying the curable composition adjacent to a surface of a substrate, wherein applying comprises positioning the curable composition in the form of a continuous or discontinuous layer. The method further includes exposing the curable composition to actinic radiation to form a cured composition that contains a polymerized reaction product of the curable composition.

Embodiment 2F is the method of embodiment 1F, wherein the curable composition is any one of embodiments 2A to 31A.

Embodiment 3F is the method of embodiment 1F or 2F, wherein the substrate is a release liner.

Embodiment 4F is the method of embodiment 1F or 2F, wherein the substrate is a polymeric film.

Embodiment 5F is the method of any one of embodiments 1F to 4F, wherein applying comprises printing or dispensing the curable composition.

Embodiment 6F is the method of embodiment 5F, wherein applying comprises screen printing or stencil printing.

Embodiment 7F is the method of any one embodiments 1F to 6F, wherein exposing the curable composition to actinic radiation comprises using a light source that is a light emitting diode.

Embodiment 8F is the method of embodiment 7F, wherein the light emitting diode emits light with a wavelength range of 365 to 460 nanometers.

Embodiment 9F is the method of embodiment 7F or 8F, wherein the light emitting diode emits light was a wavelength of 385 nanometers.

Embodiment 10F is the method of any one of embodiments 7F to 9F, wherein the curable composition is in an inert atmosphere such as nitrogen.

Embodiment 11F is the method of any one of embodiments 1F to 6F, wherein exposing the curable composition to actinic radiation comprises using a mercury vapor light source that emits light in the ultraviolet region of the electromagnetic spectrum.

Embodiment 12F is the method of embodiment 11F, wherein the photoinitiator further comprises a second photoinitiator that is activated at a shorter wavelength than the acyl phosphine oxide photoinitiator.

Embodiment 13F is the method of embodiment 12F, wherein the shorter wavelength is in a range of 240 to 300 nanometers.

Embodiment 14F is the method of embodiment 12F or 13F, wherein the second photoinitiator is methyl benzoylformate or an aromatic ketone.

Embodiment 15F is the method of any one of embodiments 11F to 14F, wherein the curable composition is an ambient environment.

Embodiment 16F is the method of any one of embodiments 1F to 15F, wherein the cured composition is a pressure-sensitive adhesive.

Embodiment 17F is the method of any one of embodiments 1F to 16F, wherein the second article is an adhesive tape or a transfer tape.

Embodiment 18F is the method of embodiment 17F, wherein the second article is a transfer tape, wherein the substrate is a release liner and the cured composition is a pressure-sensitive adhesive having a first major surface adjacent to the release liner and a second major surface opposite the release liner, the first major surface having a peel strength within 30 percent of a peel strength of the second major surface.

Embodiment 19F is the method of embodiment 18F, wherein the first major surface has a peel strength within 20 percent or 10 percent of the peel strength of the second major surface.

Embodiment 20F is the method of embodiment 17F, wherein the second article is a transfer tape, wherein the substrate is a release liner and the cured composition is a pressure-sensitive adhesive having a first major surface adjacent to the release liner and a second major surface opposite the release liner, the first major surface and the second surface have a shear adhesive strength of at least 10,000 minutes when adhered to stainless steel.

Embodiment 21F is the method of embodiment 20F, wherein the first major surface has a peel strength within 30 percent of the peel strength of the second major surface.

Embodiment 22F is the method of embodiment 21F, wherein the first major surface has a peel strength within 20 percent or 10 percent of the peel strength of the second major surface.

EXAMPLES

Materials

The materials with their sources were as listed in Table 1. Unless otherwise indicated, all materials were purchased from commercial sources and used as received.

TABLE 1

| Materials List | | | |
|---|---|---|---|
| Acronym | Type of compound or material | Description | Supplier |
| IBOA | Monomer | Isobornyl acrylate | San Esters (New York, NY, USA) |
| HPA | Monomer | 2-hydroxypropyl acrylate | Dow Chemical (Midland, MI, USA) |
| 2-EHA | Monomer | 2-ethylhexyl acrylate | BASF Corporation (Florham Park, NJ, USA) |
| IEM | Unsaturated reagent compound | Isocyanatoethyl methacrylate | Showa Denko America (New York, NY, USA) |
| IOTG | Chain transfer agent | Isooctyl thioglycolate | Evans Chemetics (Teaneck, NJ, USA) |

TABLE 1-continued

Materials List

| Acronym | Type of compound or material | Description | Supplier |
|---|---|---|---|
| DOUBLECURE TPO-L | Photoinitiator mixture | Mixture of at least 50 wt-% (e.g., 50 to 75 wt-%) diphenyl (2,4, 6,-trimethylbenzoyl) phosphine oxide and at least 25 wt-% (e.g., 25 to 50 wt-%) methyl phenylglyoxylate | Double Bond Chemical (New Taipei City, Taiwan) |
| VAZO 52 | Thermal initiator | 2,2'-azo-bis(2,4-dimethyl pentanenitrole) | DuPont Chemours (Wilmington, DE, USA) |
| VAZO 67 | Thermal initiator | 2,2'-azo-di(2-methylbutyronitrile) | DuPont Chemours Wilmington, DE, USA) |
| VAZO 88 | Thermal initiator | 1,1'-azo-bis(cyclohexanecarbonitrile) | DuPont Chemours (Wilmington, DE, USA) |
| MEHQ | Inhibitor | Monomethyl ether of hydroquinone | Nova International (Ahmedabad, India) |
| HDK H18 | Thixotropic agent | Fumed silica | Wacker Chemie AG (Munich, Germany) |
| | Release liner | PET silicone liner having a thickness of 50 microns (about 2 mils) | Used in transfer tape commercialized under the trade designation "300LSE" by 3M Company (Maplewood, MN, USA) |

Experimental Methods

Capillary Rheometry for Trouton's Ratio Measurements

Capillary rheometry was used for measurements of shear viscosity at rates up to 20000 $sec^{-1}$, and for measurements of the steady-state extensional viscosity based on contraction flow through an orifice. A Rosand RH-7 twin-bore capillary rheometer (Malvern Instruments Ltd, Malvern, Worcestershire, United Kingdom) was used with a 30-mm length, 1-mm diameter, and 90 degree entrance angle die in the first bore and a 1-mm diameter, 90 degree entrance angle orifice in the second bore. Pressure drop was recorded independently across each die. A Bagley correction was applied to account for entrance pressure effects. A Rabinowitz correction was applied to account for shear thinning effects, which tend to result in true shear rates which are greater than the shear rate predicted for a Newtonian fluid. Extensional rate and extensional viscosity were determined according to Cogswell's analysis, using the entrance pressures determined by the Bagley correction. Cogswell's analysis is described in greater detail in the article "Converging Flow of Polymer Melts in Extrusion Dies" (F. N. Cogswell, *Polymer Engineering and Science*, January 1972, 12, pp. 64-73). Trouton's Ratio is typically defined as the ratio of extensional viscosity to shear viscosity at the same rate. Trouton ratio was measured for curable compositions of Example 1 and Example 8. Results were interpolated to a shear viscosity rate of 1000 $sec^1$ and are reported below.

Molecular Weight Distribution

Curable compositions of Examples 1-8 were evaluated for their molecular weights using gel permeation chromatography (GPC). The compositions were dissolved in tetrahydrofuran at a concentration of 0.5 percent (weight/volume) and passed through a 0.45 micrometer polytetrafluoroethylene filter. Samples of the resulting solution were analyzed using an Agilent Systems (Santa Clara, Calif., USA) GPC unit equipped with one Agilent Mixed-D and one Mixed-B columns (7.8 mm×300 mm) at 40° C. (obtained from Agilent Systems) and Agilent 1260 Refractive Index Detector. After injection, samples were eluted at 1 milliliter/minute. Calibration was carried out using polystyrene standards. The weight average molecular weight (Mw) was determined and reported in Daltons (Da).

Functionality

Functionality (i.e., number of pendant (meth)acryloyl groups per polymer chain) of curable compositions of Examples 1-8 was calculated using the equation:

$$F=(A)(E)\div(F)$$

wherein:

(A) is the average molecular weight of the precursor (meth)acrylate-based polymer in grams/mole;

(E) is the moles of unsaturated reagent compound reacted with the precursor (meth)acrylate-based polymer; and (F) is the amount in grams of the precursor (meth)acrylate-based polymer treated with the unsaturated reagent compound.

Peel Adhesion Strength

Peel adhesion strength was measured at room temperature (between 23 and 25° C.) and 50% relative humidity (RH) using an IMASS Model 2000 Slip/Peel Tester (Instrumentors Incorporated, Strongsville, Ohio). A stainless-steel substrate was cleaned with 1 wash of acetone, 3 washes of heptane, and dried prior to testing. The adhesive surface of Cured Examples 1-7 was laminated to a 51 micrometers (0.002 inches) thick polyester film to give a test specimen. The test specimen measuring 1.0 inch (2.54 centimeters) wide by approximately 3 inches (15.2 centimeters) long was applied to the cleaned steel substrate. The prepared samples were dwelled at 23° C./50% RH (relative humidity) for 15 minutes before testing. A 2-kilogram rubber roller was rolled over the length of the test specimen two times in each direction to ensure intimate contact with the substrate surface. The free end of the tape test specimen was doubled back at an angle of 180 degrees and attached to the testing arm. The substrate was attached to the moveable platen on the instrument. The peel test was run at a constant rate of 12 inches/minute (30.5 cm/min) for 5 seconds and the peel force was obtained by averaging the last four seconds of data. The average peel force for the test specimen was recorded in ounces (oz) per inch (0.004 N/cm).

Shear Adhesion Strength

Shear adhesion strengths were measured at 70° C. as follows. Stainless steel (SS) panels were cleaned with one wash of acetone, 3 washes of heptane and dried prior to testing. Samples of Cured Examples 1-7 measuring 1 inch (2.54 cm) wide and between 2.5 and 3 inches (6.3 and 7.6 cm) long were cut, then centered on the cleaned panels and adhered to one end such that tape overlapped the panel by 1 inch (2.54 cm) in the lengthwise direction. The tape sample was then rolled down two times in each direction using a 4.5-pound (2-kg) rubber roller. The prepared samples were dwelled at 23° C./50% RH (relative humidity) for 24 hours before testing. The tape/test panel assembly was then suspended in a stand and tilted at an angle of 2 degrees from vertical to ensure a shear force. A 500-gram weight was hung from the free end of the tape sample. The time, in minutes, for the tape to fall from the panel was recorded. The test was terminated if failure had not occurred in 10000 minutes and the result recorded as "10000".

Preparations

Preparation of Precursor Acrylate Polymers A-G

Precursor Acrylate Polymers A-G used in Examples 1-8 were prepared by two-step bulk polymerization as generally described in U.S. Pat. No. 5,986,011 (Ellis). In the first step of polymerization, the reactor was charged with ingredients and amounts shown in Table 1A, wherein monomer amounts are expressed in weight percent, and the other ingredients were added in parts per hundred of the monomer composition. The reactor was sealed and purged of oxygen and then held at approximately 0.5 bar nitrogen pressure. The reaction mixture was heated to 60° C. and the reaction proceeded adiabatically, producing first reaction products.

TABLE 1A

| | First step of polymerization | | | | | |
|---|---|---|---|---|---|---|
| First Reaction Products | 2EHA (wt %) | HPA (wt %) | IBOA (wt %) | MEHQ (pph) | IOTG (pph) | VAZO 52 (pph) |
| First Reaction Product A | 52 | 20 | 28 | 0.02 | 0.20 | 0.001 |
| First Reaction Product B | 52 | 20 | 28 | 0.02 | 0.40 | 0.001 |
| First Reaction Product C | 52 | 20 | 20 | 0.02 | 0.30 | 0.001 |
| First Reaction Product D | 44 | 20 | 36 | 0.02 | 0.30 | 0.001 |
| First Reaction Product E | 52 | 20 | 28 | 0.02 | 0.30 | 0.001 |
| First Reaction Product F | 52 | 20 | 28 | 0.02 | 0.30 | 0.001 |
| First Reaction Product G | 52 | 20 | 28 | 0.02 | 0.30 | 0.001 |

When the adiabatic reaction temperature peaked (indication that the reaction was complete), the first reaction product was cooled to below 40° C. to initiate the second step of the polymerization. Additional ingredients were added to the first reaction product as shown in Table 1B, below. The term "pph" means parts per hundred (grams added for every 100 grams of the monomers used). The reactor was re-sealed, purged of oxygen and pressurized at 0.5 bar nitrogen pressure. The reaction mixture was heated to 60° C. and the reaction proceeded adiabatically to produce acrylate polymers.

TABLE 1B

| | Second step of polymerization | | | |
|---|---|---|---|---|
| Acrylate Polymers | VAZO 52 (PPh) | VAZO 67 (PPh) | VAZO 88 (PPh) | IOTG (PPh) |
| Acrylate Polymer A | 0.01 | 0.021 | 0.027 | 0.07 |
| Acrylate Polymer B | 0.01 | 0.021 | 0.027 | 0.13 |
| Acrylate Polymer C | 0.01 | 0.021 | 0.027 | 0.10 |
| Acrylate Polymer D | 0.01 | 0.021 | 0.027 | 0.10 |
| Acrylate Polymer E | 0.01 | 0.021 | 0.027 | 0.10 |
| Acrylate Polymer F | 0.01 | 0.021 | 0.027 | 0.10 |
| Acrylate Polymer G | 0.01 | 0.021 | 0.027 | 0.10 |

Preparation of Functionalized Acrylate Polymers 1-8

Functionalized Acrylate Polymers (Functionalized AP) 1-8 were prepared by reacting Acrylate Polymers A-G with isocyanatoethyl methacrylate (IEM) at 110° C. for 2 to 5 hours under a nitrogen/oxygen 90/10 atmosphere in the amounts shown in Table 2, below, wherein IEM amounts are expressed in parts per hundred of acrylate polymer.

Molecular weight and functionality (average number of (meth)acryloyl groups per chain) of Functionalized Acrylate Polymers 1-8 were measured and calculated following the procedures previously described. Results are reported in Table 2, below.

TABLE 2

| Preparation of curable compositions of Functionalized Acrylate polymers 1-8 | | | | |
|---|---|---|---|---|
| Functionalized Acrylate Polymer (AP) | Precursor Acrylate Polymer | IEM (PPh) | Molecular Weight (Mw, Daltons) | Functionality |
| Functionalized AP 1 | Acrylate Polymer A | 0.74 | 81,600 | 3.9 |
| Functionalized AP 2 | Acrylate Polymer B | 0.74 | 40,500 | 1.9 |

TABLE 2-continued

| Preparation of curable compositions of Functionalized Acrylate polymers 1-8 | | | | |
|---|---|---|---|---|
| Functionalized Acrylate Polymer (AP) | Precursor Acrylate Polymer | IEM (PPh) | Molecular Weight (Mw, Daltons) | Functionality |
| Functionalized AP 3 | Acrylate Polymer C | 0.74 | 54,200 | 2.6 |
| Functionalized AP 4 | Acrylate Polymer D | 0.74 | 50,900 | 2.4 |
| Functionalized AP 5 | Acrylate Polymer E | 0.74 | 56,200 | 3.4 |
| Functionalized AP 6 | Acrylate Polymer F | 0.6 | 54,900 | 2.1 |

TABLE 2-continued

Preparation of curable compositions of Functionalized Acrylate polymers 1-8

| Functionalized Acrylate Polymer (AP) | Precursor Acrylate Polymer | IEM (PPh) | Molecular Weight (Mw, Daltons) | Functionality |
|---|---|---|---|---|
| Functionalized AP 7 | Acrylate Polymer G | 0.88 | 55,200 | 3.1 |
| Functionalized AP 8 | Acrylate Polymer G | 0.95 | 60,000 | 3.7 |

Examples 1-8: Curable Compositions

Curable compositions of Examples 1-8 were prepared by mixing Functionalized Acrylate Polymers 1-8 with the materials shown in Table 3, below, wherein the amounts are expressed in weight percent (%). The mixtures were carried out at room temperature (about 23° C.) until the composition was homogeneous.

TABLE 3

Curable Examples 1-8

| Curable Examples | Functionalized Acrylate Polymers (AP) | Functionalized AP (wt %) | IBOA (wt %) | 2-EHA (wt %) | TPO-DC (wt %) | H18 (wt %) |
|---|---|---|---|---|---|---|
| Example 1 | Functionalized AP 1 | 48 | 24 | 20 | 5 | 3 |
| Example 2 | Functionalized AP 2 | 48 | 24 | 20 | 5 | 3 |
| Example 3 | Functionalized AP 3 | 48 | 24 | 20 | 5 | 3 |
| Example 4 | Functionalized AP 4 | 48 | 24 | 20 | 5 | 3 |
| Example 5 | Functionalized AP 5 | 48 | 24 | 20 | 5 | 3 |
| Example 6 | Functionalized AP 6 | 48 | 24 | 20 | 5 | 3 |
| Example 7 | Functionalized AP 7 | 48 | 24 | 20 | 5 | 3 |
| Example 8 | Functionalized AP 8 | 48 | 24 | 20 | 5 | 3 |

Trouton ratios of Examples 1 and 8 were measured following the procedure previously described. Results are reported in Table 4, below.

TABLE 4

Trouton ratio of Examples 1 and 8

| Examples | Trouton Ratio at 1000 sec$^{-1}$ |
|---|---|
| Example 1 | 13.1 |
| Example 8 | 14.3 |

Cured Examples 1-7

Curable compositions of Examples 1 through 7 were coated onto the silicone side of the PET release liner at a coating thickness of 50 microns (about 2 mils) and subjected to ultraviolet (UV) irradiation at room temperature. Coated samples were prepared in duplicates, and each sample cured using either LED lights (Model FJ200 FireJet, peak wavelength 385 nm, commercially available from Phoseon Technology, Hillsboro, Oreg., USA) or electrode-less medium pressure mercury lamps (Model F600 VPS with an H bulb, commercially available from Heraeus Noblelight, Gaithersburg, Md., USA).

Radiometers were used determine radiant power of the light sources, which was then used to calculate total energy of exposure (Target UV total). Target UV total for the LED light source was measured with a first radiometer (model LED-R L385 LEDCURE, from EIT of Leesburg, Va., USA). Target UV total for the F600 VPS light source was measured with a second radiometer, in the UVA range (model UV POWER PUCK II from EIT). Curing conditions are summarized in Table 5, below.

TABLE 5

Curing conditions

| Light Source | Description | Target UV Total (mJ/cm$^2$) | Atmosphere |
|---|---|---|---|
| LED | 385 nm wavelength | 1000 | Inert (N$_2$) |
|  |  | 2500 | Inert (N$_2$) |
| F600 VPS | Medium pressure mercury lamp | 250 | Ambient |
|  |  | 500 | Ambient |

The adhesive properties of the resulting cured layer were determined by measuring the adhesive properties on both sides of the cured layer, the front side (adhesive exposed side, FS) and on the back side (adhesive adjacent to the release liner, BS). Specifically, peel adhesion and shear strength were tested, using the test methods described above. Results are shown in Table 6, below, wherein caliper of the samples was approximately 2 mils (50 microns).

TABLE 6

Shear and adhesion to stainless steel of Cured Examples 1-7

| | | Target | Shear (minutes) | | Adhesion (oz/in) | |
|---|---|---|---|---|---|---|
| Cured Examples | Cure | UV Total (mJ/cm$^2$) | Front Side (FS) | Back Side (BS) | Front Side (FS) | Back Side (BS) |
| Cured Example 1 | LED | 1,000 | 10,000 | 10,000 | 46.26 | 44.82 |
| | LED | 2,500 | 10,000 | 10,000 | 58.17 | 56.23 |
| Cured Example 2 | LED | 1,000 | 43 | 34 | 40.46 | 34.65 |
| | LED | 2,500 | 10,000 | 10,000 | 72.33 | 69.37 |
| Cured Example 3 | LED | 1,000 | 132 | 10,000 | 35.72 | 33.40 |
| | LED | 2,500 | 10,000 | 10,000 | 54.82 | 51.43 |
| Cured Example 4 | LED | 1,000 | 10,000 | 10,000 | 53.70 | 52.49 |
| | LED | 2,500 | 10,000 | 10,000 | 71.18 | 64.91 |
| Cured Example 5 | LED | 1,000 | 10,000 | 10,000 | 48.16 | 50.14 |
| | LED | 2,500 | 10,000 | 10,000 | 67.03 | 61.66 |
| Cured Example 6 | LED | 1,000 | 51 | 47 | 51.15 | 50.38 |
| | LED | 2,500 | 10,000 | 10,000 | 83.23 | 72.30 |
| Cured Example 7 | LED | 1,000 | 10,000 | 10,000 | 35.50 | 28.20 |
| | LED | 2,500 | 10,000 | 10,000 | 56.84 | 56.62 |
| Cured Example 1 | F600 VPS | 250 | 10,000 | 10,000 | 34.56 | 22.89 |
| | F600 VPS | 500 | 10,000 | 10,000 | 63.89 | 64.39 |
| Cured Example 2 | F600 VPS | 250 | Not tested | Not tested | Not tested | Not tested |
| | F600 VPS | 500 | 10,000 | 86 | 58.40 | 61.97 |
| Cured Example 3 | F600 VPS | 250 | 10,000 | 10,000 | Not tested | Not tested |
| | F600 VPS | 500 | 10,000 | 10,000 | 57.67 | 55.60 |
| Cured Example 4 | F600 VPS | 250 | 10,000 | 32 | 43.28 | 50.03 |
| | F600 VPS | 500 | 10,000 | 10,000 | 72.78 | 72.61 |
| Cured Example 5 | F600 VPS | 250 | 10,000 | 10,000 | 28.05 | 28.55 |
| | F600 VPS | 500 | 10,000 | 10,000 | 66.11 | 64.86 |
| Cured Example 6 | F600 VPS | 250 | 19 | 13 | Not tested | Not tested |
| | F600 VPS | 500 | 10,000 | 270 | 69.26 | 71.08 |
| Cured Example 7 | F600 VPS | 250 | 10,000 | 10,000 | 52.56 | 62.99 |
| | F600 VPS | 500 | 10,000 | 10,000 | 66.52 | 65.14 |

Those having skill in the art will appreciate that many changes may be made to the details of the above-described embodiments and implementations without departing from the underlying principles thereof. The scope of the present disclosure should, therefore, be determined only by the following claims.

What is claimed is:

1. A curable composition comprising:
   a) 30 to 85 weight percent of a (meth)acrylate-based polymer having multiple pendant (meth)acryloyl groups, the (meth)acrylate-based polymer having a weight average molecular weight in a range of 35,000 to 400,000 Daltons;
   b) 10 to 70 weight percent of at least one monomer having a single ethylenically unsaturated group;
   c) 0.1 to 10 weight percent of a photoinitiator comprising an acyl phosphine oxide compound;
   d) 1 to 15 weight percent of a thixotropic agent comprising inorganic oxide particles,
   wherein the weight percent values are based on a total weight of the curable composition and wherein the curable composition is free or substantially free of an epoxy resin.

2. The curable composition of claim 1, wherein the (meth)acrylate-based polymer having multiple pendant (meth)acryloyl groups further comprises monomeric units having pendant hydroxy groups.

3. The curable composition of claim 1, wherein the photoinitiator further comprises a second photoinitiator that absorbs wavelengths of light less than 300 nanometers.

4. The curable composition of claim 3, wherein the photoinitiator is a mixture of diphenyl (2,4,6-trimethylbenzoyl) phosphine oxide and methyl benzoylformate.

5. The curable composition of claim 1, wherein the (meth)acrylate-based polymer having pendant (meth)acryloyl groups has 1 to 20 pendant (meth)acryloyl groups per chain on average.

6. The curable composition of claim 1, wherein the (meth)acrylate-based polymer having pendant (meth)acryloyl group comprises 50 to 99.9 weight percent monomeric units derived from a (hetero)alkyl (meth)acrylate, 0.1 to 10 weight percent monomeric units having a pendant (meth)acryloyl group, and 0 to 40 weight percent monomeric units having a pendant hydroxyl group, carboxylic acid group, or anhydride group based on a total weight of the (meth)acrylate-based polymer.

7. The curable composition of claim 1, wherein the curable composition is printable or dispensable.

8. The curable composition of claim 1, wherein the curable composition has a Trouton's ratio (ratio of the extensional viscosity to shear viscosity) in a range of 3 to 25 with an extensional rate of 1000 sec$^{-1}$.

9. A cured composition comprising the polymerized product of the curable composition of claim 1.

10. The cured composition of claim 9, wherein the cured composition is a pressure-sensitive adhesive.

11. An article comprising:
   a) a substrate; and
   b) a cured composition of claim 9 adjacent to the substrate, wherein the cured composition is in a form of a continuous or discontinuous layer.

12. The article of claim 11, wherein the cured composition is a pressure-sensitive adhesive.

13. The article of claim 11, wherein the cured composition is a pressure-sensitive adhesive, the substrate is a release liner, and the article is an adhesive transfer tape.

14. The article of claim 13, wherein the pressure-sensitive adhesive has a first major surface adjacent to the release liner and a second major surface opposite the release liner, the first major surface having a peel strength within 30 percent of a peel strength of the second major surface.

* * * * *